(12) United States Patent
Peljto et al.

(10) Patent No.: US 7,337,153 B2
(45) Date of Patent: Feb. 26, 2008

(54) METHOD AND APPARATUS FOR RESOLVING ENERGY IMBALANCE REQUIREMENTS IN REAL-TIME

(75) Inventors: Haso Peljto, Brooklyn Park, MN (US); Petar Ristanovic, Maple Grove, MN (US)

(73) Assignee: Siemens Power Transmission & Distribution, Inc., Wendell, NC (US)

(*) Notice: Subject to any disclaimer, the term of this patent is extended or adjusted under 35 U.S.C. 154(b) by 978 days.

(21) Appl. No.: 10/313,875

(22) Filed: Dec. 6, 2002

(65) Prior Publication Data
US 2003/0229576 A1 Dec. 11, 2003

Related U.S. Application Data

(60) Provisional application No. 60/338,424, filed on Dec. 7, 2001.

(51) Int. Cl.
G06F 17/00 (2006.01)
G06Q 40/00 (2006.01)

(52) U.S. Cl. ......................... 705/412; 705/37

(58) Field of Classification Search .......... 705/37, 705/26, 27, 63, 80, 39, 412, 1, 7, 8, 10; 700/286, 700/291
See application file for complete search history.

(56) References Cited

U.S. PATENT DOCUMENTS

| | | | | |
|---|---|---|---|---|
| 5,794,212 A | * | 8/1998 | Mistr, Jr. | 705/26 |
| 6,021,402 A | * | 2/2000 | Takriti | 705/412 |
| 6,115,698 A | * | 9/2000 | Tuck et al. | 705/37 |
| 6,978,253 B2 | * | 12/2005 | Lin | 705/26 |
| 7,099,839 B2 | * | 8/2006 | Madoff et al. | 705/37 |
| 2002/0152305 A1 | * | 10/2002 | Jackson et al. | 709/224 |
| 2002/0165816 A1 | * | 11/2002 | Barz | 705/37 |
| 2003/0055776 A1 | * | 3/2003 | Samuelson | 705/37 |

FOREIGN PATENT DOCUMENTS

WO    WO 02/103465 A2 * 12/2002

OTHER PUBLICATIONS

The Investment FAQ (part 19 or 20); 1997-2003.*

* cited by examiner

*Primary Examiner*—Igor N. Borissov

(57) ABSTRACT

A method and apparatus for resolving energy imbalance in a real-time manner is disclosed. A plurality of market user interfaces are coupled to an imbalance engine which determines optimal dispatch requirements corresponding to supply and demand requirements of the market participants. The imbalance engine resolves in a real-time manner the dispatch requirements while considering the transmission limitations, ramping limitations, transmission facilities, and price data.

17 Claims, 13 Drawing Sheets

NS: NON-SPINNING RESERVE
RR: SLOW RESERVES
SE: IMBALANCE ENERGY BIDS

NS: NON-SPINNING RESERVE
RR: SLOW RESERVES
SE: IMBALANCE ENERGY BIDS

MARGINAL MARKET PARTICIPANT

US 7,337,153 B2

METHOD AND APPARATUS FOR RESOLVING ENERGY IMBALANCE REQUIREMENTS IN REAL-TIME

CROSS-REFERENCE TO RELATED APPLICATIONS

This application claims the benefit under 35 U.S.C. § 119(e) of U.S. Provisional Application No. 60/338,424 filed on Dec. 7, 2001 which is herein incorporated by reference.

TECHNICAL FIELD

This invention relates generally to a method of generating the energy required to provide balancing energy to certain regions based on the availability of the generating resources within Regional Transmission Organizations. In particular, the invention pertains to generating and resolving energy imbalance requirements for Regional Transmission Organizations, Independent System Operators, and Independent Transmission Providers.

BACKGROUND ART

A brief description of how the energy imbalance market functions, as required by Federal Energy Regulatory Commission ("FERC") regulations, may be helpful in understanding the field of the present invention. In April 1996, FERC Order 888, "Promoting Wholesale Competition Through Open Access Non-discriminatory Transmission Services by Public Utilities," required jurisdictional public utilities to file access transmission tariffs to allow competition in the supply of wholesale electrical energy. Under the Order 888 market entities (utilities, merchant generators energy traders, etc.) compete to provide energy based on several factors including cost and availability of transfer capacity on transmission facilities. Market entities can be limited from providing energy certain regions based on the availability of transfer capacity on transmission facilities.

According to the framework established by Order 888, provision of energy to resolve imbalances in the actual production of energy versus scheduled energy was the responsibility of the Transmission Provider and was covered as part of the Open Access Tariff. The Transmission Provider usually satisfied this requirement without a market mechanism by self-generating the required balancing energy.

In December 1999, FERC issued Order 2000, "Regional Transmission Organizations." This order required jurisdictional public utilities to form and participate in a Regional Transmission Organization ("RTO"). The operational control of generators, and transmission facilities was assigned to the Regional Transmission Organization. Under FERC regulations, RTOs are required, among other things, to ensure that its transmission customers have access to a real time balancing market. An RTO may cover parts of one or more states within the United States. RTOs are required to maintain efficient traffic grid management, to improve grid reliability, to monitor and mitigate against opportunities for discriminatory transmission practices, and to improve competition in the wholesale electricity markets. The RTO is expected to administer the open access transmission tariff, to exercise operational control over, congestion management, reliability and to plan the expansion of its transmission system. An additional set of requirements for RTOs are that they remain independent of the market participants.

In the framework of FERC Order 2000, the RTO is responsible for providing transmission customers with access to a real time balancing market. Several market operators met the requirements of this order by redispatching all energy in a real time market, followed by financial settlement of energy imbalances. The requirements of this order can also be met by the imbalance engine described below.

In July 2002, FERC issued a Notice of Proposed Rulemaking (NOPR), "Remedying Undue Discrimination through Open Access Transmission Service and Standard Electricity Market Design." This NOPR announces FERC's intent to form a standard market design for wholesale electrical energy. This NOPR requires public utilities to place their transmission assets that are used in interstate commerce under the control of an Independent Transmission Provider or ITP. Among other functions, an ITP is responsible for operating a day ahead market and a real time market for balancing energy.

In the day ahead market, spot market prices are generally determined based on offers to supply energy and on forecast requirements for load. A supply curve is determined using either marginal costs or bid prices to rank order the plants beginning with the cheapest plants. However, the FERC NOPR recognizes that to create a truly competitive wholesale power market, the market must also allow for price responsive loads.

In this framework, the market operator receives pricing information from various wholesale market generators (typically coal-fired power plants, hydroelectric power plants, nuclear power plants, etc.) and receives energy requirements information from the Load Serving Entities. The market operator is then responsible for determining an operating plan based on the offers provided by the various market generators and the bids provided by the various Load Serving Entities in the most cost effective manner.

Presently, all generators provide schedule information to control area operators in the form of a statement of quantity of energy they plan to generate and the time at which the energy will be generated. The amount of energy may vary over the course of a day, changing typically in hourly increments based on a variety of factors. Under the framework of Order 2000 and the FERC NOPR, market participants may voluntarily offer to supply additional energy beyond the predetermined scheduled amount or alternatively to reduced the energy supplied below the previously scheduled amounts so that the RTO can satisfy real time balancing requirements. Additional energy costs arise when the market generator is requested to provide less energy than previously contracted for in order to meet an unanticipated glut of energy.

Computer systems within an RTO (Regional Transmission Organization, Independent System Operator, or Independent Transmission Provider) generate a daily operating plan that determines for each time increment for the following day how much energy will be supplied by each generator. The energy needs are forecast for each day based on known statistical methods of forecasting electrical demand. The forecast is typically accurate but seldom one hundred percent accurate as to the energy demands for a certain region. Accordingly, as the energy plan from the previous day is carried out by the RTO, the energy demands are not one hundred percent accurate. More or less energy is actually needed than that which was in the energy plan, and there may be deficiencies in the amounts of energy actually supplied by generators due to forced or unplanned outages for maintenance. This variance in energy requirements is referred to as imbalance energy or balancing energy requirements. The RTO computer system addresses that imbalance by using the bid and offer information received from market participants.

The RTO is required by the FERC Order 2000 to implement an energy imbalance market. The imbalance market requires a real-time market for bidding to provide energy generation and load adjustments to satisfy the imbalance. Therefore, instead of relying on contracted prices generated one or more days in advance, a method must be provided to allow market generators and loads to bid for adjustments (for example, by providing more or less energy) in a real-time manner during the day in real time as the energy imbalance occurs.

The imbalance market uniquely requires a real-time market for bidding and for providing the energy generation adjustments required to satisfy the imbalance. The present invention address the above noted needs by providing a real-time imbalance engine to support and implement the equitable imbalance requirement via a computer system implementation. The imbalance engine enables the RTO to operate a load following scheme to implement the FERC 2000 and NOPR requirements for implementation of an equitable energy imbalance market. The imbalance market mechanism assures a means other than the use of dedicated regulation and reserve resources or bilateral contract markets to balance load and generation. Additionally, the present invention allows the market generators and loads to provide electronic bids for resolution by the imbalance engine.

SUMMARY OF THE INVENTION

According to one aspect of the invention, there is provided a system for balancing the load requirements for energy imbalance in an energy trading market, said system comprising: a plurality of market user interfaces, each market user interface receiving from a plurality of market participants supply and demand requirements for imbalance energy; and an imbalance engine coupled to said plurality of market user interfaces for determining optimal market dispatch corresponding to said supply and demand requirements.

BRIEF DESCRIPTION OF THE FIGURES

The present invention will now be described with reference to the accompanying drawings wherein.

DETAILED DESCRIPTION OF THE FIGURES

Figure 1:
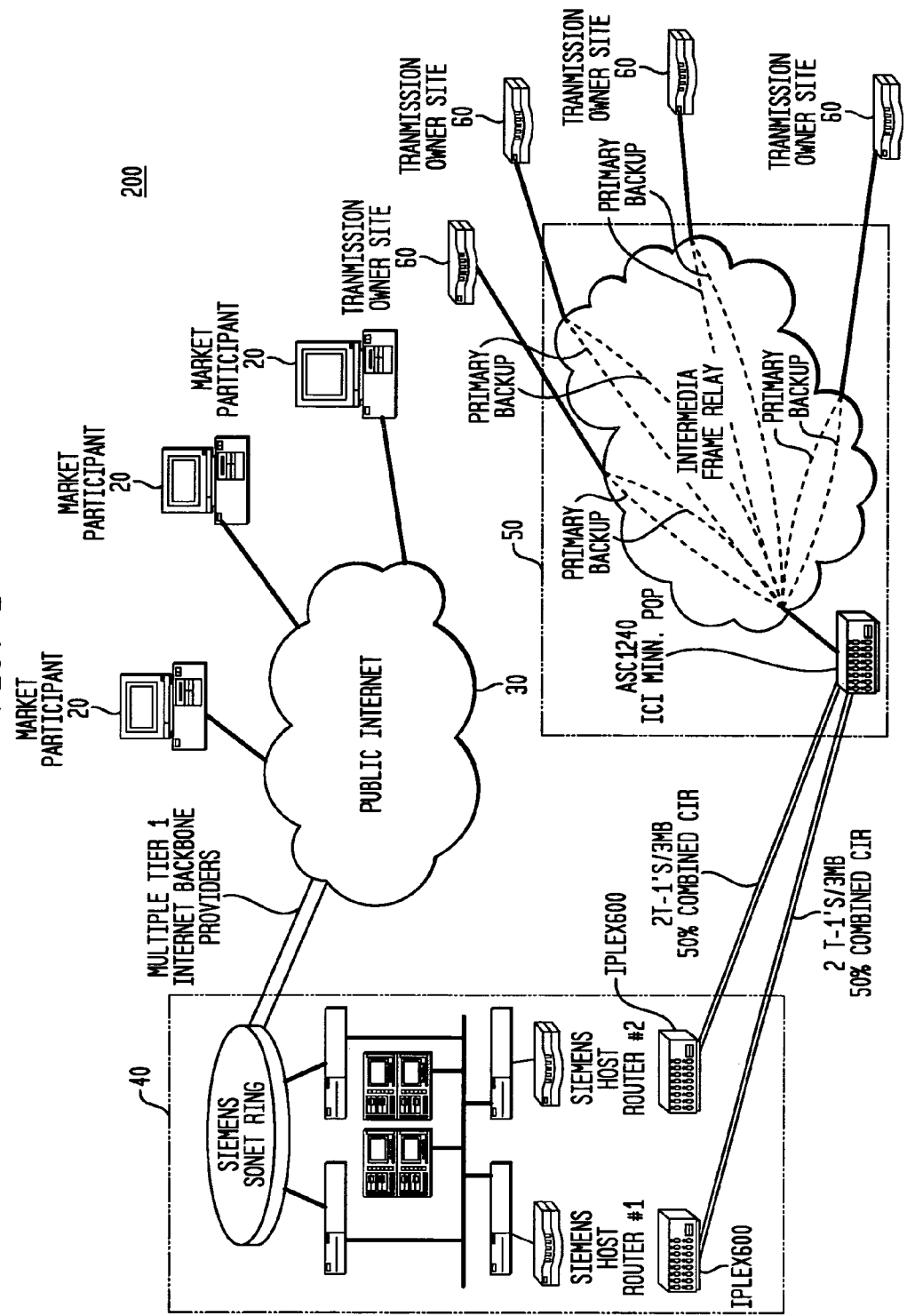
FIG. 1 is a schematic diagram of the implementation of a real time imbalance engine in accordance with the principles of the present invention.

To illustrate the principles of the present invention, a real-time imbalance engine developed by Siemens Power Transmission & Distribution, Inc., the assignee of the present invention, shall be described in detail. While this engine constitutes a preferred embodiment of the invention, it is not the intention of applicants to limit the scope of the invention to the particular details of this engine. Rather, it is the intention of the applicants that the invention be defined by the appended claims and all equivalents thereto.

The imbalance engine seeks to assure a means, other than the use of operating reserve and regulation resources or bilateral contract markets, to balance load and generation. The present invention allows the market generators and loads to provide electronic bids for resolution by the imbalance engine via an electronic interface. The present invention includes features such as: (1) providing load following service; (2) improving economic efficiency of energy deliveries in the RTO region; (3) minimizing the capacity required for regulation; (4) improving control performance of the control areas in an optimum manner; and (5) providing key coordination capabilities in an equitable manner for the control areas within the RTO region.

In one embodiment of the present invention, all balancing energy bids and offers are evaluated and cleared through the imbalance market engine of the present invention. The imbalance market engine supports optimal imbalance market operation, while actual implementation of balancing energy dispatch will be provided by control area energy management systems ("EMS") which control the physical operation of the generating units and price responsive loads within the RTO. It should be noted that a control area is a geographical area within the RTO region. Imbalance market dispatch instructions issued from the imbalance engine are treated as directions to improve control area efficiencies through overall RTO optimization.

In an alternative embodiment of the present invention, the RTO may operate as a both a transmission provider and a virtual control area. In this embodiment, the imbalance engine may use existing or conventional energy management system controls to adjust generation output of those generators willing to adjust output in this manner for compensation via balancing energy pricing. The imbalance market engine relies on the existing or conventional EMS systems and their associated control systems for implementation of imbalance signals. The Imbalance Engine also sends a dynamic schedule to its associated EMS systems that represent individual purchase or sale of imbalance energy. These schedules represent set points in the imbalance market and the units will be expected to follow those signals in a controlled and reasonably predictable manner.

As stated previously, the imbalance market is operated by an RTO. The RTO manages a region which is split into non-overlapping pricing zones. RTO pricing zones are generally static and are coincident with RTO control areas. For instance, each pricing zone will consist of one or more network nodes.

Generator balancing energy bids indicate a market generator's willingness to deviate from the previously established schedule and to operate his unit at a specific output in return for specific compensation. There is no obligation of a generator to submit balancing energy bids or to follow bid curves (for example, participation in the RTO energy imbalance market is voluntary). However, there is an expectation that market generators who do bid and receive awards, will follow their bid obligations in a predictable manner. Other generators are expected to operate according to their previously established schedules.

Any load (for example, a consumer of electrical energy) can also participate in a similar manner as generators to the extent that they meet the same metering requirements and can reliably vary the load. The load will participate on an equal basis with market generators sources after some consideration for transmission losses.

The imbalance engine automatically accounts and adjusts for transmission losses. The imbalance engine is integrated across all internal RTO control areas or pricing zones, and dynamically schedules energy across these control areas to minimize the differences in zonal imbalance prices. The inadvertent energy will be priced at balancing energy prices. The money and energy accounts for each control area will be established as a part of a settlement system. Therefore, there are no direct needs to consider inadvertent energy as a part of imbalance energy requirements during imbalance market dispatch.

Balancing energy bids (for example, bids required to supply unplanned requirements or reduce for unplanned gluts) are submitted by market generators for each quarter hour increment. The same bid can be submitted and stand for several hours. If a bid is not submitted then the market generator will not be considered. Bids cannot be entered or adjusted after twenty minutes before the operational fifteen minute period. The submitted bids will be used during the operational 15 minute period without adjustments.

In a preferred embodiment, the imbalance engine is operated every five minutes for real-time adjustments to the imbalance requirements. The dispatch instructions are issued two or three minutes (or some appropriately adjustable lead time) before the operational five minute interval. Every execution will perform optimal imbalance dispatch for three future five minute intervals for a full fifteen minute period of time. It will be understood that the time period intervals are adjustable, limited only by the market generator's operational ability to ramp up or down their energy output. All dispatch reports will be presented, but only the first 5 minute interval dispatch will be used for operational pricing and settlement purposes.

The imbalance engine of the present invention filters control signals so as not to operate units beyond their specified ramping or generation limits. In particular, each market generator has a defined ability to ramp up or ramp down their energy output, and the imbalance engine factors in those ramping and generation limits. The imbalance engine recognizes the constraint and does not attempt to have a market generator to increase or decrease its output at an impossible rate. Uninstructed deviations may be considered for penalties.

The imbalance engine determines the imbalance prices as Locational Marginal Prices for each market participant. Billing balancing energy prices are calculated every 5 minutes in real time and integrated over one hour for settlement purposes.

The imbalance engine has a mechanism to dynamically schedule energy across control areas to minimize control area Area Control Errors ("ACEs") and maximize the performance of the control areas. The North American Electricity Reliability Council ("NERC") control performance standards (CPS1 and CPS2), and disturbance control standard (DCS) are applicable to the individual control areas.

The imbalance engine relies on the RTO emergency backup system as the back-up system. Therefore, the combined RTO systems will be fail-safe as far as functionality. The imbalance engine will receive adjustments to generation bids via the market user interface.

In one embodiment, the imbalance engine may operate with a significant lag compared to conventional control and regulation systems. The imbalance engine filters out control that should be provided via regulation units. Generally, it is expected that regulation units will provide control over changes from real-time to several minutes ahead of real-time. The imbalance engine is focused on the period of time past the regulating time period but short enough to effectively provide load following capability.

Energy provided in the imbalance market will not be separately charged for transmission usage. Therefore, the real-time imbalance price will not include any additional transmission usage costs. A relational database may be used as the storage mechanism for the RTO imbalance engine input and output.

The operation of the imbalance market provides a reasonably smooth reliable load following that is accomplished with the operation of minimal regulation assets. The implementation of this market is to improve and not degrade the ability of control areas to maintain their CPS1 and CPS2 reliability standards.

The imbalance engine prevents the operation of the imbalance market from causing flow gates congestion or impacting already congested flow gates. The imbalance engine interfaces with the control areas within the RTO region. The imbalance engine interface uses the control areas within the RTO region to interface the existing real time imbalance engine.

The imbalance engine integrates with the existing control area EMS systems responsible for managing control area operations. The imbalance engine employs pricing rules and settlement methodology that provide for payment adequacy, revenue neutrality and price stability.

In a preferred embodiment, the imbalance engine additionally features a high level of availability with protection against a single point of failure and a minimum of 99.95% availability. The hardware, database and application allow for the addition and deletion of features and functions such as new Energy Management System ("EMS") system interfaces, and expanded capability for data transfer.

Additionally, the imbalance engine features two aspects of user security and privacy. The first guarantees a reliable storage mechanism to securely protect data availability and the second security feature allows a market participant to access to his own data privately without allowing any other market participant to view his data, or vice versa.

Turning now to the drawings in detail, wherein like numbers illustrate corresponding structure, FIG. 1, is a schematic diagram of the implementation of a real time imbalance engine in accordance with the present invention. The implementation 200 consists of a plurality of market participants (for example, energy generators) 20 which are coupled to the public internet 30. Each market participant is represented by a computer terminal which can also be representative of a user terminal or user interface for accessing the RTO 40. The RTO is represented in the figure as a network host which is coupled to the market participants 20 through the public internet. The RTO 40 facilitates communication between the market participants 20 and the transmission and generation facilities 60. Communication between the RTO and the transmission facilities may be accomplished over direct network links 50. It will be understood that network links 50 can be a proprietary network or a public internet.

Figure 2:
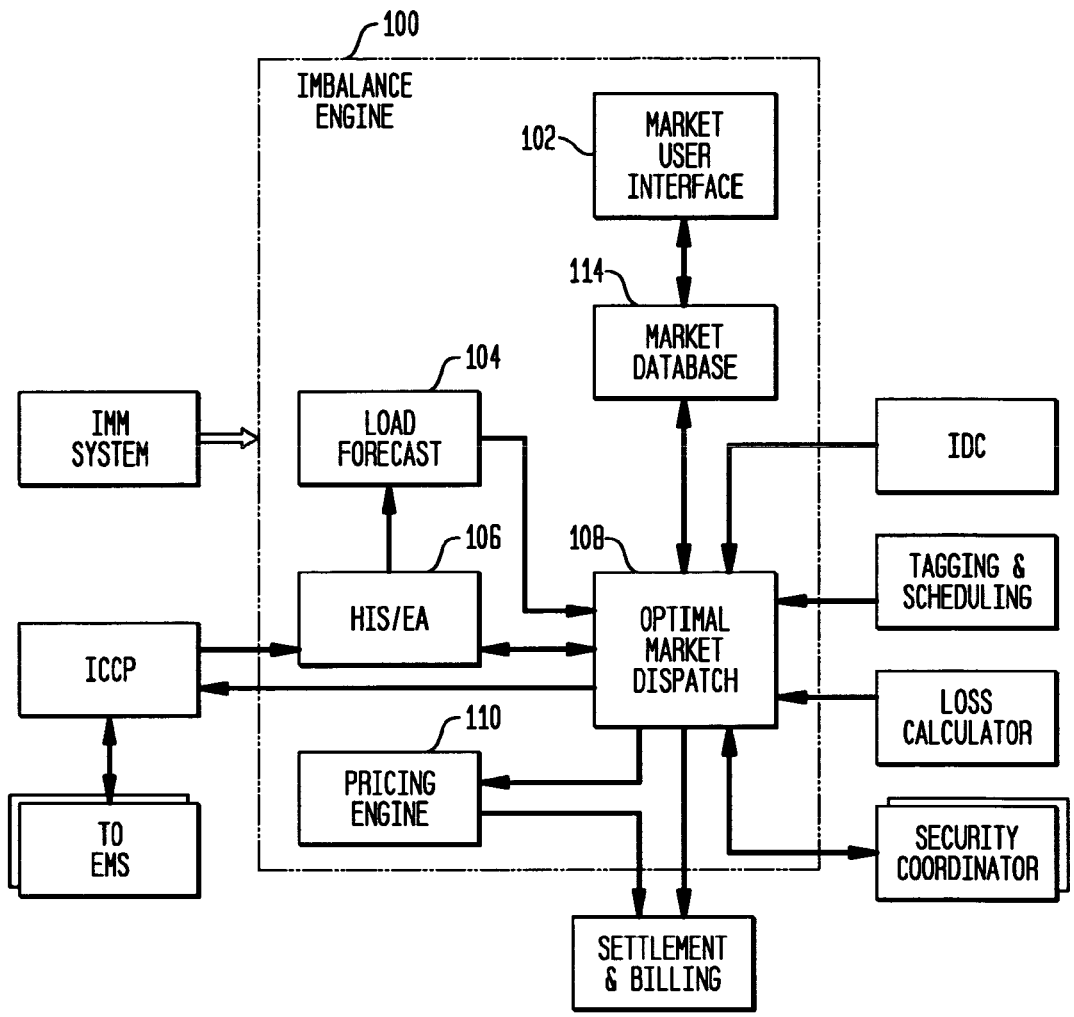
FIG. 2 is an exemplary block diagram of the components and interfaces of the imbalance engine in accordance with the principles of the present invention.

Referring to FIG. 2, there is shown an exemplary block diagram of the components and interfaces of an imbalance engine 100 in accordance with the principles of the present invention. The imbalance engine 100 consists generally of a market user interface 102, an energy imbalance forecast engine 104, a component for handling energy measurements processing, archiving and accounting 106, a market optimal dispatch 108, a component for balancing energy pricing 110, and a market database 114.

Each of these subsystems are discussed briefly below. Further details on the operations of each of these subsystems are discussed later. The market user interface 102 is the gateway between the market participants and the imbalance engine 100. It will be understood that each market participant accesses the imbalance engine 100 through its own interface 102. In a preferred embodiment, the market user interface 102 is preferably a thin client web-based stand-alone sub-system supported by its own database storage. The market user interface is flexible and may be adapted for the addition of future additional market commodities with a minimum effort.

The market user interface 102 initially facilitates market participant registration. For instance, when a new market participant wants to participate in the imbalance market, the market participant registers with the imbalance engine 100. The market user interface 102 additionally allows market participants to enter bid data and validation information. The market user interface 102 additionally visually represents the market dispatch information. The market user interface 102 additionally includes security protocols whereby the market participant may be verified and entered into the system as a valid user. The market user interface additionally includes the functions necessary to enter bid data and validate the bid data. The market user interface 102 presents to the market user the results of the bidding process by presenting the market dispatch and pricing results to the market user. The market user interface 102 additionally includes the market time-line control to show the participants the time sensitive information. The market user interface 102 additionally includes bulk upload and download interfaces. Through the market user interface 102, the market participant is allowed to perform bulk upload of bidding data and bulk download of demand information.

The market database 114 is functionally coupled to the market user interface 102 and is used to track and record the bidding and clearing processes of the market users. The market database 114 interfaces bid data to the optimal market dispatch 108 and transfers imbalance engine dispatch orders from the optimal market dispatch 108. The data transfers are performed automatically in accordance to the time lines of the order bidding and clearing processes. It will be understood that the market database 114 may be implemented with any commercially available database.

The optimal market dispatch 108 is functionally coupled to the market database 114. The optimal market dispatch 108 processes bidding data received from market participants and distributes processed dispatch instructions and clearance data. The optimal market dispatch 108 determines ex-post prices for actually provided balancing energy from the market generators.

The pricing engine 110 is functionally coupled to the optimal market dispatch and facilitates optimal pricing parameters for dispatched energy orders. The HIS/EA database 106 provides calculations that pertain to historical data and stores historical data for archival purposes. The load forecast 104 is functionally coupled to the HIS/EA database and determines 5-minute average load for the next three 5-minute intervals for each control area.

Figure 3:
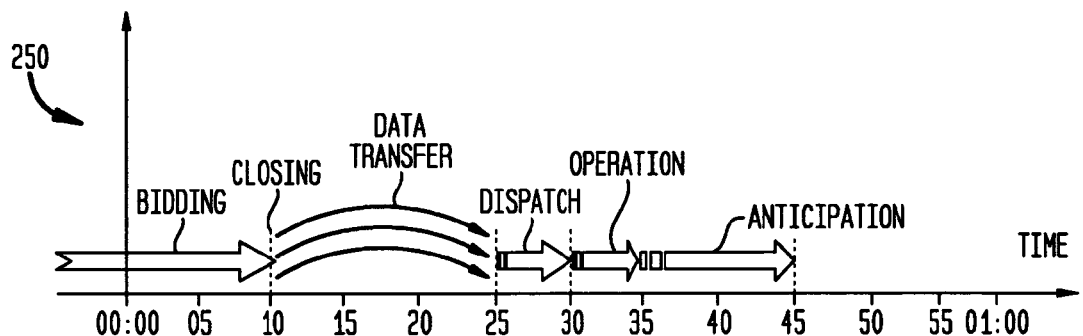
FIG. 3 is a time-line of the operation of the imbalance engine.
Figure 4:
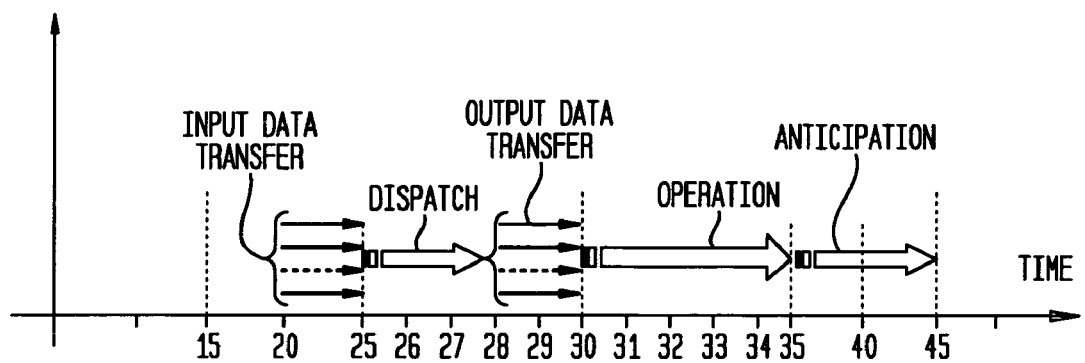
FIG. 4 is a time-line of the operation of the imbalance engine.

Referring to FIGS. 3 and 4, there is shown the imbalance engine time-line 250. The time-line is based on the operation cycles of the market operator and is based on fundamental market rules related to the energy imbalance market. As previously stated, the market bidding cycle is 15 minutes starting at the top of the hour. The imbalance market is closed 20 minutes before operational 15-minute period. Imbalance market dispatch is performed every 5 minutes cyclically. The dispatch is performed for three future 5-minute intervals. The same bids are used for the complete 15-minute period in accordance with the bidding process. The time-line for imbalance market dispatch is as shown in FIG. 4. Dispatch instructions are sent to generating and load facilities in accordance with the output from the imbalance engine.

It will be useful to note that there are several important issues related specifically to the design of a real time energy imbalance market for the RTO that need to be discussed at this point. Most of the Independent System Operators ("ISOs") that are in operation in the United States (for e.g., California, PJM, New York and New England) already operate electricity markets. One feature common to these markets is the existence of a single control area. In contrast, many of the future RTOs will involve multiple control areas. The present invention has the further advantage of having the ability to function in regions with multiple control area environments that can further be adapted for single control area environments.

The RTO in such an environment operates as a virtual control area that encompasses the existing control areas of its members. The imbalance market will consist of multiple pricing zones and control areas that are integrated together through dynamic scheduling. Such dynamic scheduling requires the ability to make intra-hour schedule adjustments. Also specific to the energy market is the system balancing requirements which need to be addressed beyond the normal function of automatic generation control ("AGC").

Figure 5:
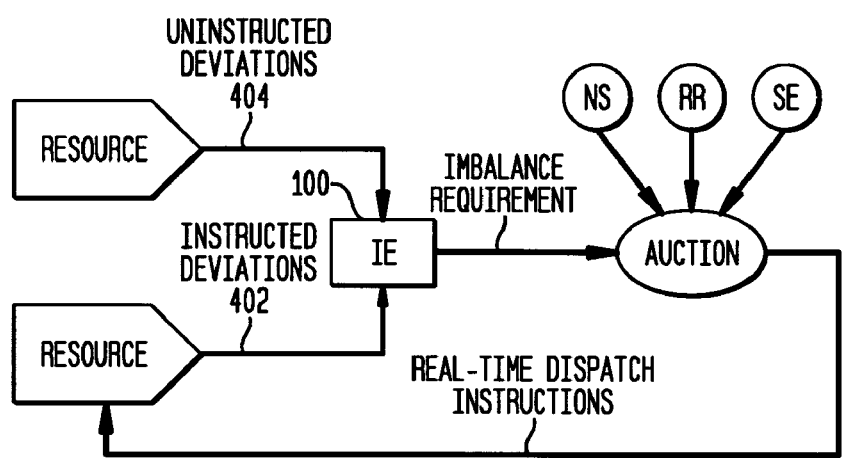
FIG. 5 is a schematic diagram of the operation of a real-time market for any resource.
Figure 5A:
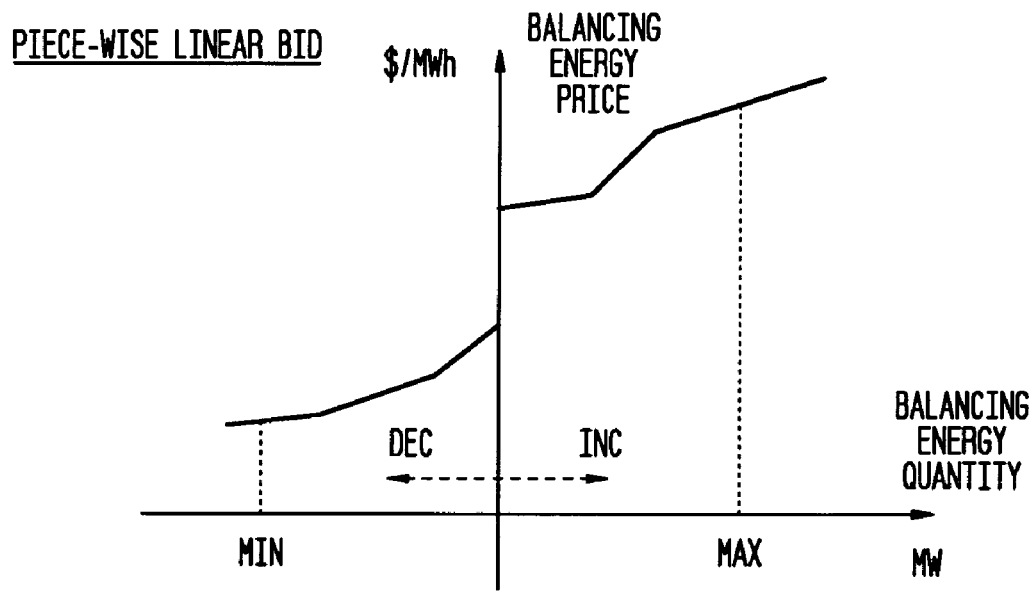
FIGS. 5(a) and 5(b) are graphs of balancing energy prices versus balancing energy quantity.
Figure 5B:
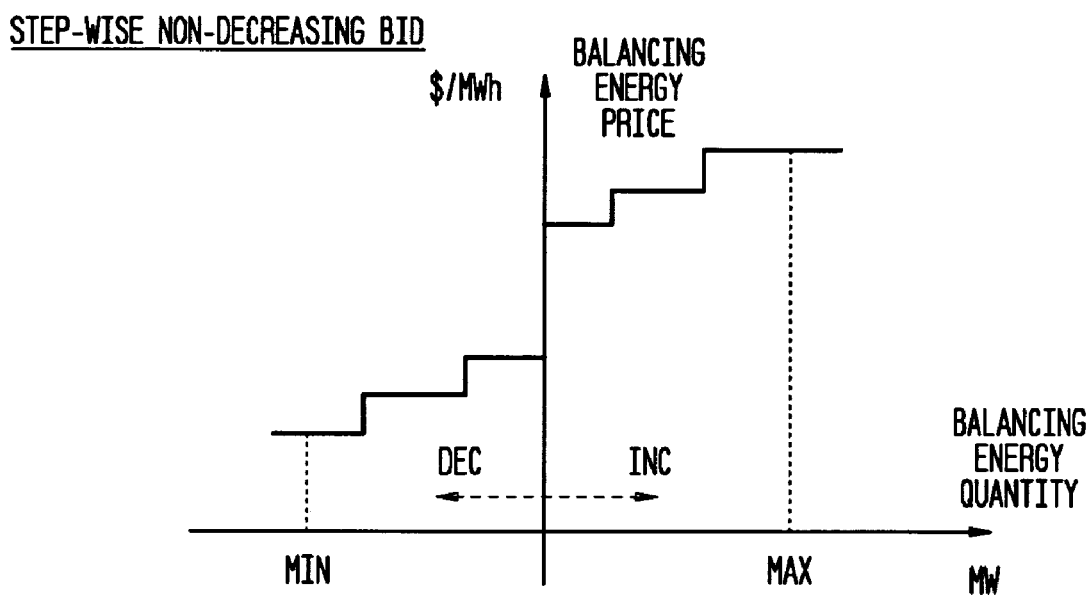

Referring to FIG. 5, there is shown a typical real-time market mechanism or model for any commodity or resource. Irrespective of the particular re-dispatch method that is employed in a real-time energy imbalance market, any imbalance in the particulars of the market mechanism is illustrated with respect to FIG. 5. Deviations from the scheduled resource delivery can be classified into instructed deviations 402 and uninstructed deviations 404. Instructed deviations 402 are the results of participating resources responding to the RTO's dispatch instructions. Uninstructed deviations 404 are the result of load forecast errors, strategic behaviors, modeling limitations, etc. in the operating plan that do not fully account for energy and temporal constraints, failure to follow dispatch instructions, etc. Both types of deviations from the forecasted model affect the imbalance requirement presented to the imbalance engine 100.

Instructed deviations 402 are price-setters while uninstructed deviations 404 are price-takers. FIG. 5 illustrates the feedback loop between uninstructed deviations 404 and instructed deviations 402 in the operation of the typical real-time market for resources.

This re-dispatch of the selected resources by the imbalance engine 100 results in a feasible outcome. That is, no security or contingency constraints are violated. Furthermore, if there are any such violations due to system condition changes, resources are re-dispatched to remove the violations even if there is no need for real-time balancing energy to balance the system. An exemplary handling of the bid data is illustrated with respect to FIGS. 5(*a*) and 5(*b*) along with the detailed description of the market user interface 102.

These sub-systems are described in more details in the following sections. The flexibility and configurability of the invention allow for future expansion of the basic platform to incorporate capacity based markets (ancillary services), or mechanisms that further facilitate liquidity of the imbalance market.

In an exemplary embodiment, upload/download templates are provided for the market participants to transfer information in bulk. An XML ("Extensible Mark-up Language") file format document will describe the file and field formats for each type of upload/download data file. Separate upload/download templates will be provided to correspond with the data content of the market participant displays.

The main functional elements of the market user interface 102 are described in more detail in the description below. One function of the market user interface 102 is to accept bidding data from the market participants. Bidding data can include the following specification of available balancing energy. The market participant ID uniquely identifies the market participant. The type of bid, whether the bid is to adjust load or generation, is also recorded and maintained on the market user interface. The balancing energy bid price curve is additionally displayed to the market participant. The maximal and minimal limits for energy generation or consumption are additionally displayed. The maximal up and down ramp rates for energy generation are additionally displayed on the market user interface. The validity time specifying 15 minute time periods for which the bid is valid is additionally displayed on the market user interface. The submitted time is additionally displayed on the market user interface.

In a further embodiment, the bidding data can additionally include more fields. For instance, single part generator/load or portfolio station/Control Area bids (within the same control area or pricing zone) are supported. Separate load and generation control area portfolio bids must be submitted. More than one load and more than one generation portfolio bid can be submitted by control area. Both generation and load entities can submit balancing energy bids. The Incremental and Decremental parts of balancing energy bids are separated by scheduled MW point. Balancing energy prices can be negative.

The set of load or generation resources contributing to the portfolio bid is static and it is defined through the Information Model Management system. A portfolio should contain only resources connected at the same station bus. Otherwise, dispatch rules for internal portfolio resources must be provided as a part of a portfolio bid. The rules should determine set points for each resource as a percentage contribution to the portfolio bid.

Balancing energy price curves are piece-wise linear monotonically increasing functions. Additionally, the price curves can contain both vertical and flat segments and may even include a completely step-wise non-decreasing bid curve. To ensure a smoother imbalance market operation, piece-wise linear bid curves are preferred. The maximal number of segments is 20 (10 Inc and 10 Dec balancing energy segments). The minimal segment size is one megawatt. Typical balancing energy bids are shown in FIGS. 5(*a*) and 5(*b*).

Entered bid data are validated with respect to their completeness, consistency and market rules. Eventual discrepancies are reported to the market participant and market operator. A bid validation process accesses the registration information of market participants to verify imbalance providers and static wholesale customers.

In a preferred embodiment, the load forecast 104 determines 5-minute average load for the next three 5-minute intervals for each control area individually. Accordingly, all imbalance requirements and market participant MW set points are determined as 5-minute average values. To this end, meter information, day-before forecasts, and other elements are used to generate the imbalance forecast.

The HIS/EA database 106 is the energy measurements processing, archiving and accounting component database and provides the following calculations and historical data for time periods after real-time-operation: (1) collection, processing and integration of control area generator and tie-line analog measurements; (2) calculation of loads for the RTO and each control area; (3) collection of weather data that may be required for very short-term load forecasts and imbalance energy forecasts; (4) calculation of control areas ACE, frequency bias, inadvertent energy and net interchange; (5) collection, tracking and performance calculation of unit response to imbalance control signals over an extended period of time necessary to track unit control performance and to use this data to predict the response in terms of ramping rates, overshoot, gain and other performance tracking measures; (6) collection of data necessary for preparation of imbalance settlement data; (7) support for market participants in analyzing their long-term performance in energy imbalance market; (8) imbalance energy market audit support; (9) support for market monitoring; and (10) long term archiving and off-line storage of all relevant data from the imbalance engine.

All real-time data collected from individual Control Areas via ICCP are stored in HIS/EA database 106. The ICCP is an industry standard protocol for transmitting data to and from energy management systems. The HIS/EA is a historical database of relevant data stored for archival and prediction purposes.

The market optimal dispatch component 108 is another core subsystem component of the imbalance engine 100. The market optimal dispatch component 108 typically minimizes the cost of operating the imbalance market, and optimizes inter zonal balancing energy transfers while respecting power balance constraints, balancing energy limits and inter-area transmission constraints. Transmission network losses are explicitly modeled as loss sensitivity coefficients.

The market optimal dispatch 108 also performs re-dispatch of generating units at the same time that it solves for the imbalance requirement. By re-dispatching, the imbalance engine 100 provides the optimal solution for all bids (Inc and Dec) while providing the imbalance requirement and preventing flow gate congestion within the energy network. The imbalance market operator is able to switch ON and OFF the re-dispatch feature. In one embodiment, when the re-dispatch is disabled, if the RTO wide imbalance requirement is for incremental energy ("Inc"), then only Inc movements will be allowed, and if the RTO imbalance requirement is for decremental energy ("Dec"), then only Dec movements will be allowed.

The results of market optimal dispatch 108 are as follows. The imbalance market clearing price ("MCP") is set by the market optimal dispatch. The optimal schedule for net interchange correction for each control area is also set. The optimal set point for each market participant is also set by the market optimal dispatch. The optimal LMP for load and generation for each control area and price zone and each market participant is set by the market optimal dispatch.

The imbalance engine 100 will operate using software designed for LMP calculations In one embodiment, the number of nodes and network model employed will be simplified so that the engine effectively operates as a zonal pricing engine. The simplified representation may be extended to allow a detailed representation of the transmission system with accompanying LMPs for each node represented in the model.

The imbalance market optimization objective is considered as a part of the overall optimization of system operation. The imbalance market is situated between the bilateral energy market (that is, pre-arranged energy MW exchanges at agreed prices as opposed to real-time imbalance spot market pricing) and automatic generation control (the actual transfer of energy). Balancing energy is the generation of variations around bilaterally scheduled energy values to satisfy system load. Conceptually, the imbalance market is consistent with, but in addition to, the bilateral energy market, and settlement and billing system.

Figure 6:
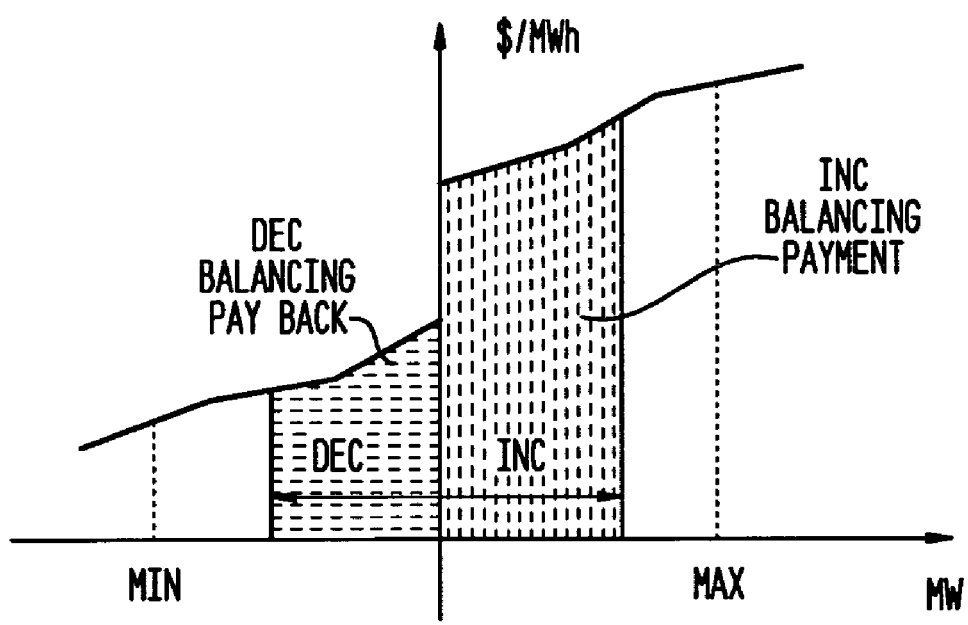
FIG. 6 is a graph of price versus MW.

The approach to the Imbalance Engine is hereby described. The optimization objective is to minimize total imbalance market costs to the RTO by providing optimal balancing energy prices to market participants. If a generator provides Dec balancing energy then costs present its pay back to the RTO, (In this model, the generator receives payment for all of the amount of MW nominally scheduled. The payback to the RTO reflects the fact that not all of the nominally scheduled MW is delivered when the Dec bid is accepted). If a generator is providing Inc balancing energy then costs presents its payment from the RTO. The imbalance engine 100 employs the Inc and Dec bid amounts to cover the imbalance (variation from scheduling). (See FIG. 6).

Therefore, the minimization objective function is:

$$\sum_{stp}\sum_{mp} BidCost(BidMW) = \qquad (1)$$

$$\sum_{stp}\sum_{mp}(IncPayment(IncMW) - DecPayback(DecMW))$$

Where:
mp is the unique Market Participant identification;
stp is the resource type set (valid values: GEN for a generation, LD for a load); BidMW is the MW point for the Market Participant mp;
BidCost(BidMW) is the bid cost at the BidMW point;
IncPayment(IncMW) is the payment for IncMW of Inc balancing energy; and
DecPayback(DecMW) is the pay back for DecMW of Dec balancing energy.

The RTO imbalance requirement is calculated every 5 minutes as the sum of all control area 5-minute imbalance requirements including schedule ramping rules:

$$ImbReq_{5\,min}^{ARTO} = \sum_{ControlArea} ImbReq_{5\,min}^{CA}.$$

The control area 5-minute imbalance requirement is calculated as the difference between control area 5-minute load forecast and total control area scheduled generation and bilaterally scheduled interchange. The last 5-minute ACE averages and imbalance biases are added for each Control Area:

$$ImbReq_{5\,min}^{CA} = LF_{5\,min}^{CA} - \sum_{stp}\sum_{mp} SchedMW_{5\,min} - \qquad (2)$$

$$ACE_{5\,min}^{CA} + ImbBias_{5\,min}^{CA} - ImbCA_{5\,min}^{CA}$$

Where:
$ImbReq_{5\,min}^{ARTO}$ is the total RTO imbalance requirement;
$ImbReq_{5\,min}^{CA}$ is the Control Area imbalance requirement;
$LF_{5\,min}^{CA}$ is the Control Area 5-minute load forecast;
$SchedMW_{5\,min}$ is the scheduled bilateral energy with already included transmission losses and bilaterally scheduled Interchange;
$ACE_{5\,min}^{CA}$ is the Control Area last 5-minute average ACE;
$ImbBias_{5\,min}^{CA}$ is the Control Area 5-minute Imbalance Bias; and
$ImbCA_{5\,min}^{CA}$ is the Control Area 5-minute Imbalance Callable Reserve.

The control area ACE represents specific control area requirements with respect to its actual operating conditions. Additionally, each control area can set an imbalance bias as an additional (positive or negative) request for balancing energy. Potentially the imbalance bias can be used for control area self-balancing purposes. All of these data are inputs to the imbalance engine provided by the control area EMS interfaces.

The total RTO imbalance requirement to be dispatched $ImbReq_{5\,min}^{ARTO}$ is filtered with weighting factors for some previous, the current and the next 5 minute values. Weighting coefficients associated with past values (up to 5 steps) are variables which can be entered at the market operator interface by the Market Operator. The default values are 20% for one previous, 60% for current and 20% for the next 5-minute interval.

The non-filtered imbalance requirement (0%, 100%, 0%) is the default option.

The RTO balancing energy requirement is satisfied using all available resources:

$$\sum_{stp}\sum_{mp}(1 - LosFac)\cdot BidMW = ImbReq_{5\,min}^{ARTO} \qquad (3)$$

The energy balance constraint takes into account the transmission network losses by normalizing generation and load MW values with the corresponding loss sensitivity factors, LossFac. The transmission network losses differentiate balancing energy prices for generators and loads to provide financial covering for network losses.

Figure 7:
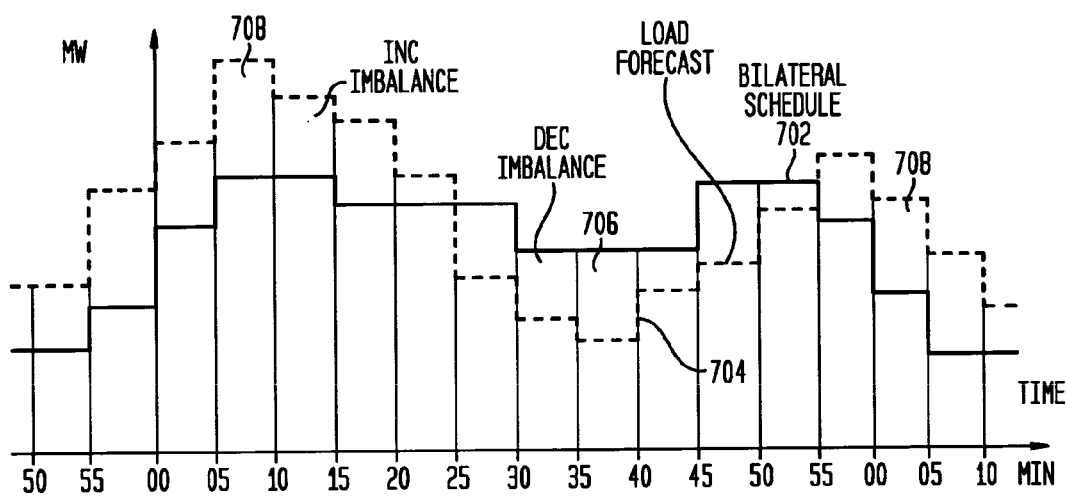
FIG. 7 is a graph of MW versus time.

An exemplary time diagram for an imbalance requirement is shown in FIG. 7. The line 702 shows the bilateral schedule, that is, the pre-arranged energy schedule generated one or more days prior. The forecast line 704 shows the actual five minute real time forecast. The area 706 between the curves where the schedule line 702 exceeds the forecast line 704 illustrates Dec imbalance and the area 708 between the curves where the forecast line 704 exceeds the schedule line 702 illustrates Inc imbalance.

Effective dispatch limits for balancing energy are determined as the most narrow of the submitted generation limits and the possible changes around the actual operating point during the 2 minutes interval with the submitted ramp rates. Formally:

$$\text{EffMin} \leq \text{BidMW} \leq \text{EffMax} \quad (4)$$

for all bids.

Where:
EffMin=max {BidMin, ActMW−RampRate·2 min} is the effective minimal limit;
EffMax=min {BidMax, ActMW+RampRate·2 min} is the effective maximal limit;
BidMW is the balancing energy amount;
ActMW is the actual generation
BidMin is the minimal generation limit
BidMax is the maximal generation limit.

The transmission losses have an impact on the overall imbalance market operation. For example, the impact on market clearing prices consists of the following. The optimal imbalance market clearing process consists of the following problem:

$$\min \sum_{stp} \sum_{mp} BidCost(BidMW) \text{ subject to}: \sum_{stp} \sum_{mp} (1 - LosFac) \cdot BidMW = ImbReq_{5\min}^{ARTO}.$$

Using the Lagrange function and market clearing price (MCP) this problem can be transformed into:

$$\min \left\{ \sum_{stp} \sum_{mp} [BidCost(BidMW) - MCP \cdot (1 - LosFac) \cdot BidMW] \right\} + MCP \cdot ImbReq_{5\min}^{ARTO}$$

The optimality conditions:

$$\frac{\partial BidCost(BidMW)}{\partial BidMW} - MCP \cdot (1 - LosFac) = 0$$

can be expressed as:

$$MCP = \frac{1}{1 - LosFac} \cdot \frac{\partial BidCost(BidMW)}{\partial BidMW}.$$

The above condition must be satisfied for each market participant. The market clearing price will increase because of network losses. There is an influence of network losses on locational marginal prices that is dependent on corresponding loss sensitivity factors representing transmission network losses. Each portfolio or single bid has its own loss sensitivity factor with respect to the reference node in the RTO.

Loss sensitivity factors, LossFac, are calculated using a reference bus approach. That is, the generation at the reference bus moves whenever an increment is made at a generating unit. This change in generation output causes a change in losses, too. The power balance can be expressed as:

$$\Delta P_{gen} + \Delta P_{ref} = \Delta P_{loss}.$$

To calculate the corresponding loss sensitivity factor:

$$LosFac = \frac{\Delta P_{loss}}{\Delta P_{gen}} = 1 + \frac{\Delta P_{ref}}{\Delta P_{gen}}$$

all we need is the coefficient:

$$\beta = \frac{\Delta P_{ref}}{\Delta P_{gen}}.$$

These coefficients can be calculated for all Market Participants using Jacobian matrix J of the Power Flow solution:

$$\begin{bmatrix} \frac{\partial P_{ref}}{\partial P_{g1}} \\ \frac{\partial P_{ref}}{\partial P_{g2}} \\ \vdots \\ \frac{\partial P_{ref}}{\partial P_{gN}} \end{bmatrix} = [J^T]^{-1} \cdot \begin{bmatrix} \frac{\partial P_{ref}}{\partial \theta_1} \\ \frac{\partial P_{ref}}{\partial \theta_2} \\ \vdots \\ \frac{\partial P_{ref}}{\partial \theta_N} \end{bmatrix}$$

The loss sensitivity factors are calculated by the loss calculator component. The inputs to the loss calculator are provided from a standard Power Flow Inter control area/price zone flows are optimized while satisfying flowgate operating limits in both directions.

$$\underline{FG_l} \leq FG_l \leq \overline{FG_l} \quad (4)$$

The flowgate flow model is in incremental form around scheduled or real-time values. Energy transfer flows are presented as a DC model using distribution factors:

$$FG_l = FG_l^S + \sum_{stp}\sum_{mp} SF_{mp,l} \cdot BidMW_{mp} \quad (5)$$

where:
- $FG_l$ and $BidMW_{mp}$ are the optimal power flow for flowgate l and the optimal generation output of the Market Participant mp, respectively
- $SF_{mp,l}$ is the shift factor for the MW injection of the Market Participant mp on the flowgate l
- $\underline{FG}_l$ and $\overline{FG}_l$ are MW line flow limits for the flowgate l in direct and reverse directions
- $FG_l^s$ is the set point for power flow at the flowgate l. The actual flowgate power flows will be used.

The economic transfer of power through control areas within the context of imbalance energy requirements of all control areas in the least cost fashion is a necessity. Since market generators have submitted bids for balancing energy, they have volunteered to modify the output of their units. They are willing sellers or buyers at a price at a particular point in time. It should be of no concern to the market generators that some portion of the control area energy may flow to or come from a different control area. More importantly without the convergence of imbalance price between control areas, we cannot claim to have an integrated market.

The imbalance engine of the present invention recognizes transmission line loading relief ("TLR") called by the security coordinator(s) to curtail selected energy transfers between Control Areas to relieve overloads on congested flowgates. The imbalance engine further makes available to the security coordinators the magnitude and expected magnitude of those schedules so that the security coordinators can make informed decisions about how much of the energy transfers need to be curtailed.

The imbalance market clearing process is based on nonlinear Dantzig-Wolfe decomposition supported by the revised simplex method. Dantzig-Wolfe is a decomposition algorithm for linear programming solutions. The decomposition of the market dispatch problem results in the master problem related to overall imbalance market optimization, and a set of sub-problems related to the individual market participant optimizations.

To solve the master problem, the revised simplex method is employed. The results provide optimal market clearing prices based on sub-problem solutions found in previous iterations. These prices are passed to the sub-problems as market coordination signals. The new set of sub-problems are solved and the solutions are returned back to the master problem. These responses are compared to the market requirements for Inc and Dec balancing energy requirements. Any imbalance causes updates for market prices leading to supply/demand balance for each market product.

Market participant optimization provides its best response to posted market prices. These sub-problems present a multiple product co-optimization from a single market participant's point of view. The sub-problems absorb all economic and physical characteristics specific to each market participant.

Figure 8:
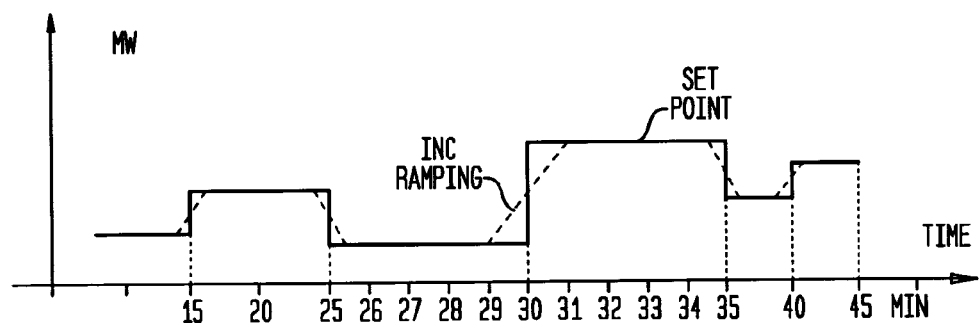
FIG. 8 is a graph of MW versus time.

In accordance to the Dantzig-Wolfe approach, optimality must be improved at each iteration. Otherwise, the optimal solution of the market dispatch problem has been achieved. Tied bids will be dispatched pro rata, i.e. proportionally to the length of tied bid MW segments. The pro rata bids will be dispatched to the market participant The optimal results include both market clearing prices and optimal balancing energy set points for each market participant. The optimal results consist of the desired 5-minute average values that are expected to be implemented in the future time. The implementation of the imbalance market dispatch results will be supported by standard ramping rules applied in accordance to market participant dynamics. Ramping will start 1 minute before the start of the operational 5-minute interval. This ramping rule will provide balancing energy service as it is dispatched by the imbalance market. These effects are illustrated in the time diagram of FIG. 8.

The imbalance engine 100 operates normally when it is inside its operating limits. Certain checks must be made to determine whether the imbalance engine remains with its operating limits. The following operational checks are applied in the specified order:

No Market Participants—To operate the imbalance market at least one valid bid must be submitted. The market cannot operate without bids.

Imbalance Engine does not operate properly—If the imbalance engine is down for 15 minutes or less then the imbalance engine uses the last valid solution price(s). After more than 15 minutes of down time, manual intervention by the RTO operator will be required.

Imbalance Requirement not feasible—If there is not enough Inc or Dec bid capacity to cover the actual imbalance requirement, then the imbalance requirement is set to the maximal or minimal possible level. Regular market clearing will be performed and provided optimal results used as dispatch instructions.

Inter Control Area flow limits not feasible—If inter control area flow limits do not provide enough transfer capacity to cover the energy imbalance requirement, then the imbalance requirement will be satisfied as much as possible with minimal violation of inter control area flow limits. The inter control area flow limits will have higher priority than the imbalance requirement. Regular imbalance market clearing will be provided with minimal changes of the inter control area flow limits and/or imbalance requirement to provide feasibility. The LMPs will include both network losses and network congestion in a regular way.

If any of the above checks are positive, then appropriate warning message are created.

Balancing energy pricing is based on the imbalance market clearing results. These ex-ante prices are modified before being used for billing purposes depending on ex-post quantities of balancing energy.

The imbalance market clearing provides optimal balancing energy prices and quantities under expected operational conditions. In the presence of transmission network losses and eventual flow gate congestion, each market participant will have different balancing energy prices.

Formally, the optimal imbalance market clearing process consists of the following problem:

$$\min \sum_{stp}\sum_{mp} BidCost(BidMW_{mp})$$

subject to:
power balance:

$$\sum_{stp}\sum_{mp}(1 - LosFac_{mp}) \cdot BidMW_{mp} = ImbReq_{5\min}^{ARTO}$$

flowgate constraints:

$$\underline{FG_l} \leq FG_l = FG_l^S + \sum_{stp}\sum_{mp} SF_{mp,l} \cdot BidMW_{mp} \leq \overline{FG_l}$$

Using Lagrange function, this problem can be transformed into:

$$\min\left\{\sum_{stp}\sum_{mp}[(BidCost(BidMW_{mp}) - MCP \cdot (1 - LosFac_{mp}) \cdot BidMW_{mp})) + \sum_l FCP_l \cdot SF_{mp,l} \cdot BidMW_{mp}]\right\} + con.$$

The optimality conditions are satisfied if each market participant operates under its locational marginal price determined by:

$$LMP_{mp} = (1 - LossFac_{mp}) \cdot MCP - \sum_l FCP_l \cdot SF_{mp,l} \quad (6)$$

Where:
$LMP_{mp}$ is the locational marginal price for the market participant mp;
MCP is the balancing energy market clearing Price (result of imbalance market dispatch);
$LossFac_{mp}$ is the loss sensitivity factor for the market participant mp;
$SF_{mp,l}$ is the shift factor for the MW injection of the market participant mp on the flow gate l; and
$FCP_l$ is the shadow price for the flow gate l constraint (result of imbalance market dispatch).

Resulting locational marginal prices are the optimal price signals for both loads and generators from the market participant point of view. With these locational marginal prices, the profit is maximal at dispatched set point for each market participant individually.

For each market participant the actually provided increase and decrease balance energy services are calculated every five minutes. Inc balancing energy for generation market participants is calculated as the difference between actual and schedule energy generations and for load market participants as the difference between scheduled actual energy consumptions. On the other hand, the Dec balancing energy for generation market participants is calculated as the difference between scheduled and actual energy generations, and for load market participants as the difference between actual and scheduled energy consumptions.

Figure 9:
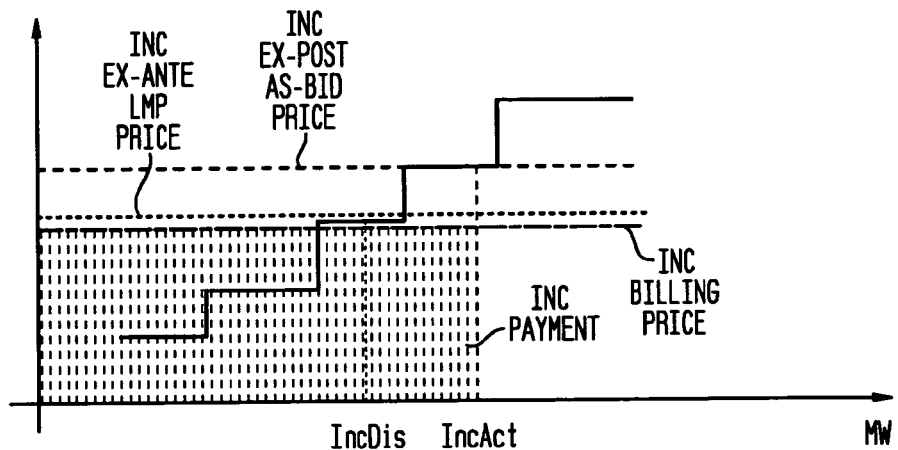
FIG. 9 is a graph of price versus MW.
Figure 10:
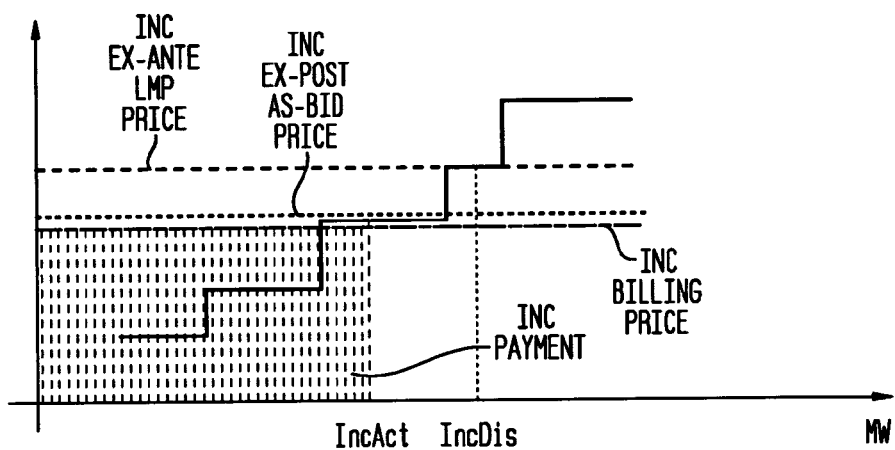
FIG. 10 is a graph of price versus MW.
Figure 11:
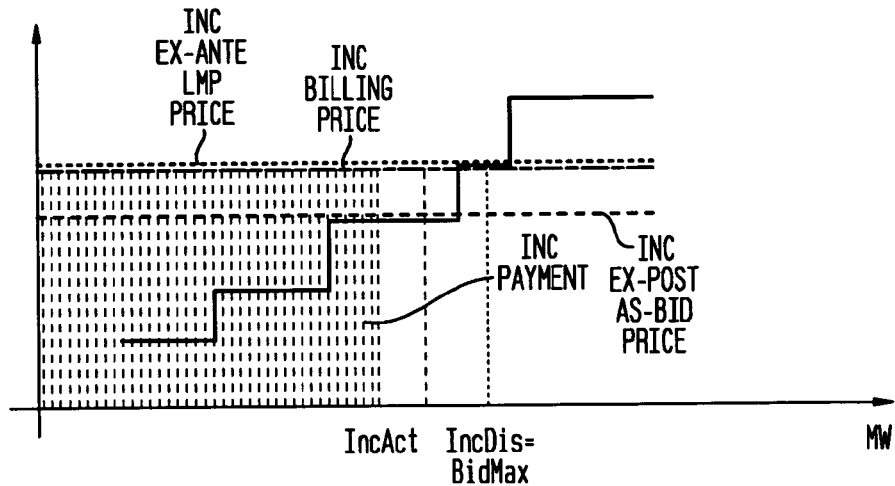
FIG. 11 is a graph of price versus MW.

The ex-ante locational marginal prices ("LMP") are modified after-the-fact to provide billing prices. The modifications are performed for each market participant individually depending on balancing energy actually provided. For generating market participants, the billing price calculations are based on the following rules:

If the balancing energy service actually provided, is higher than the optimal dispatch set point then ex-ante locational marginal price is applied as the billing price for each marginal market participant. FIG. 9 illustrates the appropriate billing price for this situation. If the balancing energy service actually provided is lower than the optimal dispatch set point then the ex-post as-bid price is applied as the billing price for marginal market participant. FIG. 10 illustrates the appropriate billing price for this situation. For a non-marginal market participant (dispatched on its minimal or maximal limit) the ex-ante locational marginal price is applied as the billing price for actual balancing energy independently of uninstructed deviations from the dispatched set point. FIG. 11 illustrates the appropriate billing price for this situation.

These rules set the billing price for marginal market participants to be the lower of either the ex-ante locational marginal price and the ex-post as-bid price. This means that any market participant cannot directly control the balancing energy price in any case. Uninstructed reductions in balancing energy service below the dispatched set point will cause the decreasing of the billing price, while uninstructed balancing energy service increasing above dispatched set point will not be awarded by any increasing of the billing price. It will be apparent to one of ordinary skill in the art that similar pricing rules will be used for load market participants.

Additionally, for market non-participants the following rules can be applied:

If movement is in the same direction as the Imbalance Market requirement, then the provided support will be compensated by setting the Billing Price equal to some percentage of the Locational Marginal Price. For Inc balancing energy, a percentage less then one hundred will be used (the default value is 90%), and for Dec balancing energy, a percentage higher then one hundred will be used (the default value is 110%). This represents the payment to the RTO. To be fully compensated (at 100%) it is necessary for the generator to be a market participant and to contribute in market clearing process and price setting.

If movement is in the opposite direction to the Imbalance Market requirement, then the imbalance disturbance will be charged at the Locational Marginal Price for both Inc and Dec energy imbalances. This rule will be applied in charging for balancing energy to all entities causing system imbalance.

In any case, to provide settlement prices, the 5 minute Billing Prices for each Market Participant are averaged during one hour using the following formula:

$$BP_{mp}^T = \frac{\sum_{t \in T}(IncMW_t \cdot BP_{mp}^t - DecMW_t \cdot BP_{mp}^t)}{\sum_{t \in T}(|IncMW_t| + |DecMW_t|)} \quad (7)$$

Where:
$BP_{mp}^T$ is the settlement Billing Price for the Market Participant mp for the period T (one hour);

IncMW$_t$ and DecMW$_t$ is provided Inc and Dec balancing energy for the time interval t (5 minutes); and BP$_{mp}^t$ is the Billing Price for the Market Participant mp for the time interval t (5 minutes).

If there is no network congestion then all market participants belonging to the same pricing zone will have the same price. Additionally, hourly average price for imbalance requirement for each control area will be calculated as follows:

$$BalCost_{CA}^T = \sum_{t \in T} \frac{ImbReq_{5\,min}^{CA}}{T} \cdot MCP_{5\,min}$$

Where:
- BalCost$_{CA}^T$ is the balancing energy cost for the control area for the period T (one hour);
- ImbReq$_{5\,min}^{CA}$ is the imbalance requirement of the control area for the time interval t (5 minutes); and
- MCP$_{5\,min}$ is the market clearing price for the RTO for the time interval t (5 minutes).

Figure 12:
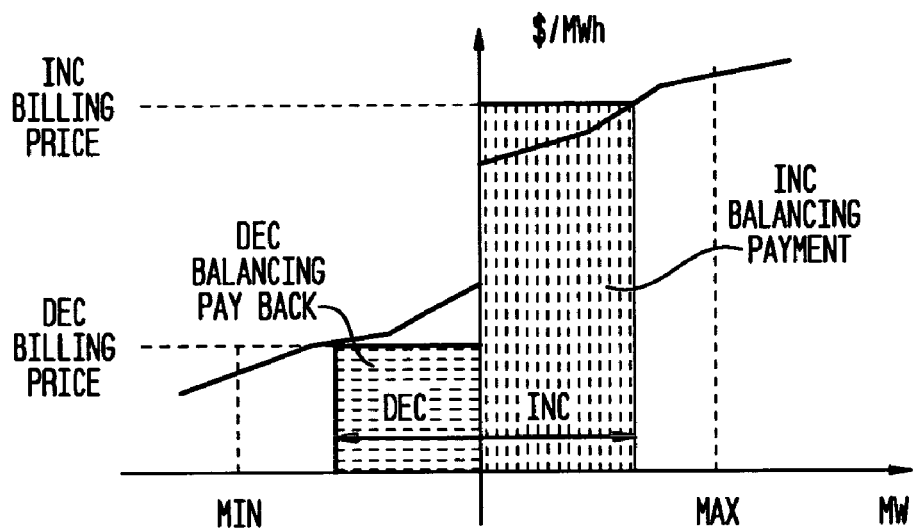
FIG. 12 is a graph of price versus MW.

It will be noted that for Inc balancing service, generators are paid by the RTO. Conversely, for Dec balancing service, generators pay back to the RTO. This is illustrated in FIG. 12.

For load market participants, money flows in the opposite direction to what heretofore has been described. The averaged billing prices and balancing energy total quantities are passed to a conventional settlement system for billing purposes.

Furthermore, in addition to the above described pay-as-MCP pricing scheme, the pay-as-bid balancing energy pricing will be provided. It will be noted that the operator may select the pricing scheme.

Imbalance market clearing provides optimal balancing energy prices and quantities under expected operational conditions. Instead of the locational marginal price, the as-bid price is determined by comparing the dispatched set point to the bid curve for each market participant individually.

Figure 13:
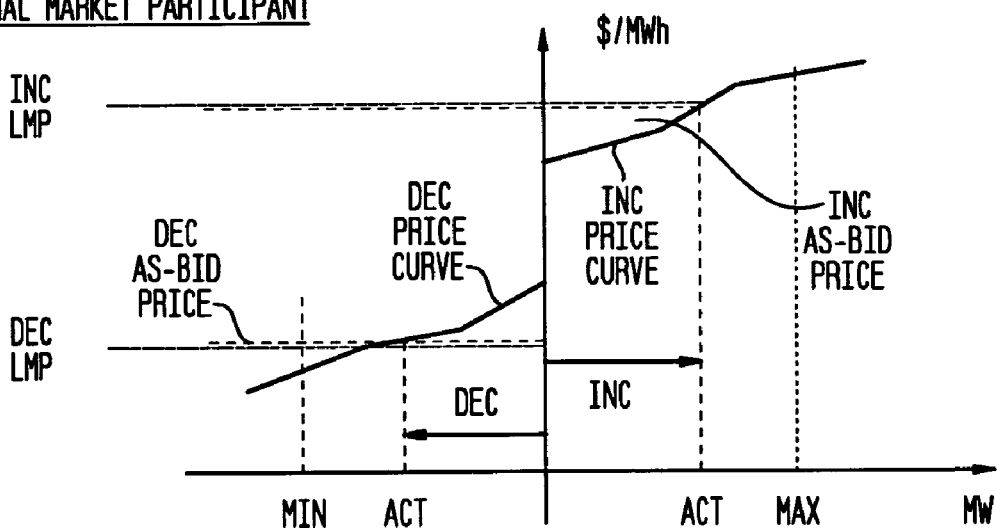
FIG. 13 is a graph of price versus MW.

For each marginal market participant, the as-bid price is equal to its locational marginal price because the dispatched balancing energy price and quantity are matched on the bid curve inside the dispatch limits. This price will include network losses and eventual network congestion. Referring to FIG. 13, there is shown the Inc as-bid price and Inc price curve, and the Dec as-bid price and the Dec price curve against the MW axis for each market participant.

Figure 14:
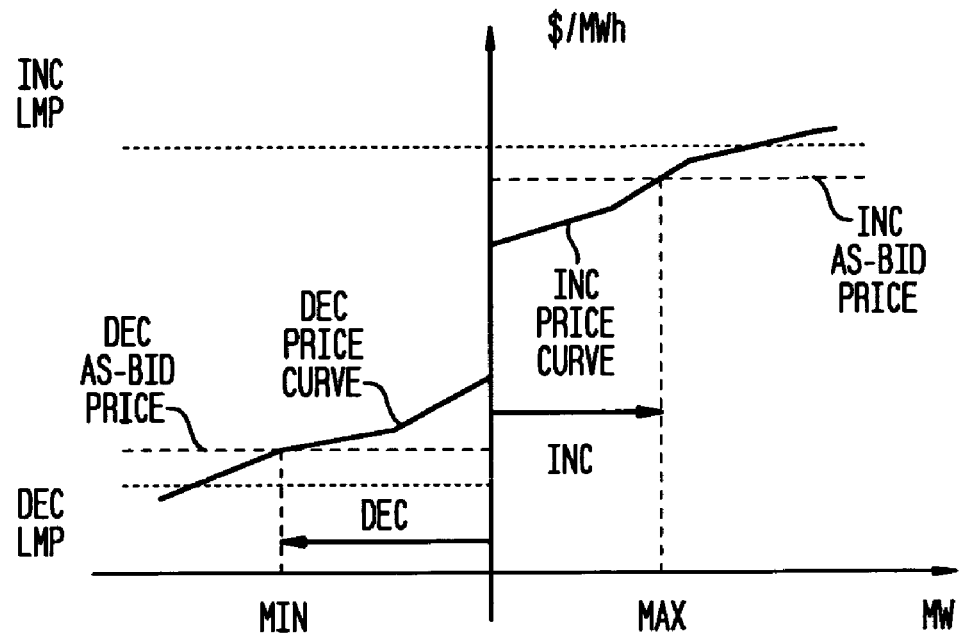
FIG. 14 is a graph of price versus MW.

For the non-marginal market participant, the dispatched set point is on the minimal or the maximal balancing energy limit. The ex-ante as-bid price is determined by comparing these extreme set points with the submitted bid curve. In this case, LMP for Inc balancing energy is higher, and LMP for Dec balancing energy is lower than the appropriate ex-ante as-bid prices. This is illustrated in FIG. 14.

Ex-ante as-bid prices are still optimal price signals for both loads and generators from the market participant's point of view. Under these prices, the profit is maximal at the dispatched set point for each market participant individually. Non-marginal market participants are blocked by balancing energy limits from following the price movement from as-bid to the LMP level.

The actually provided Inc and Dec balancing energy services are calculated every 5 minutes for each market participant. The provided Inc balancing energy for generation market participants is calculated as the difference between actual and scheduled energy generation and for load market participants as the difference between scheduled and actual energy consumption. On the other hand, the Dec balancing energy for generation market participants is calculated as the difference between scheduled and actual energy generations, and for load market participants as the difference between actual and scheduled energy consumptions.

Figure 15:
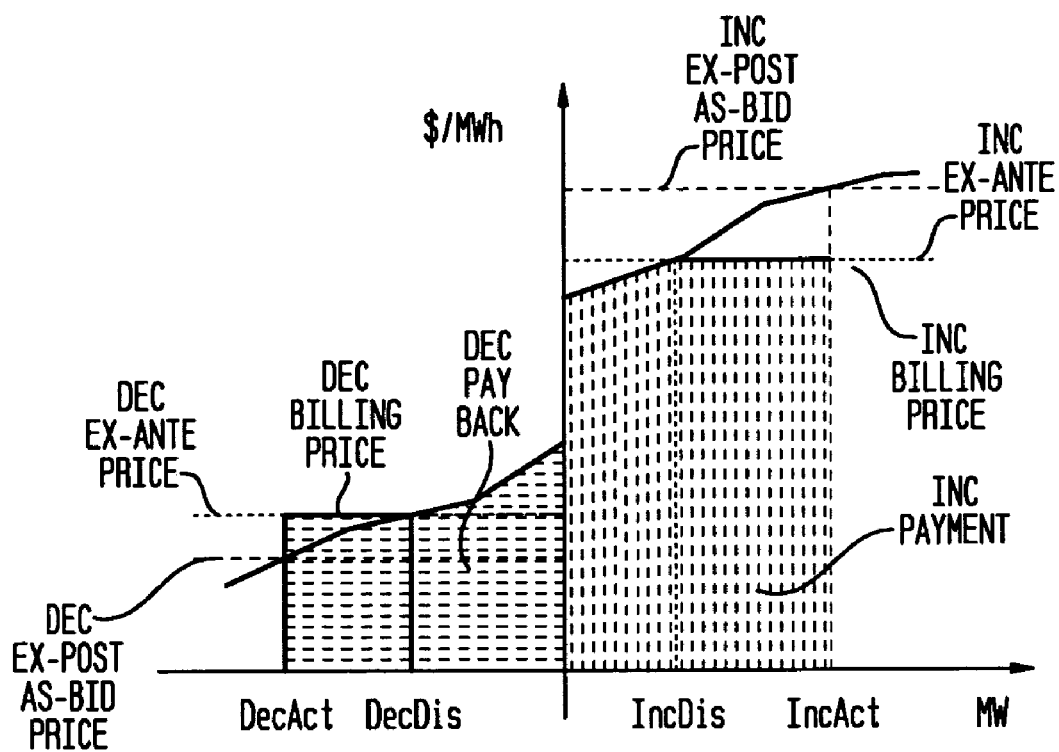
FIG. 15 is a graph of price versus MW.

The ex-ante as-bid prices are modified after-the-fact to provide billing prices. The modifications are performed for each market participant individually depending on the actually provided balancing energy. For generating market participants, the billing price calculations are based on the following rules:

If the actually provided Inc or Dec balancing energy service is higher than the optimal dispatch set point then operating costs will be covered to the optimal dispatch set point, and Ex-Ante As-Bid Price is applied above the optimal dispatch set point. This is illustrated in FIG. 15. The billing price is calculated as follows:
  Calculate costs as area under bid curve to the ex-ante dispatched point;
  Calculate payment above ex-ante dispatched point using ex-ante As-bid price;
  Calculate total payment as sum of two above;
  Calculate billing price as ratio of total costs and actual balancing energy.

Figure 16:
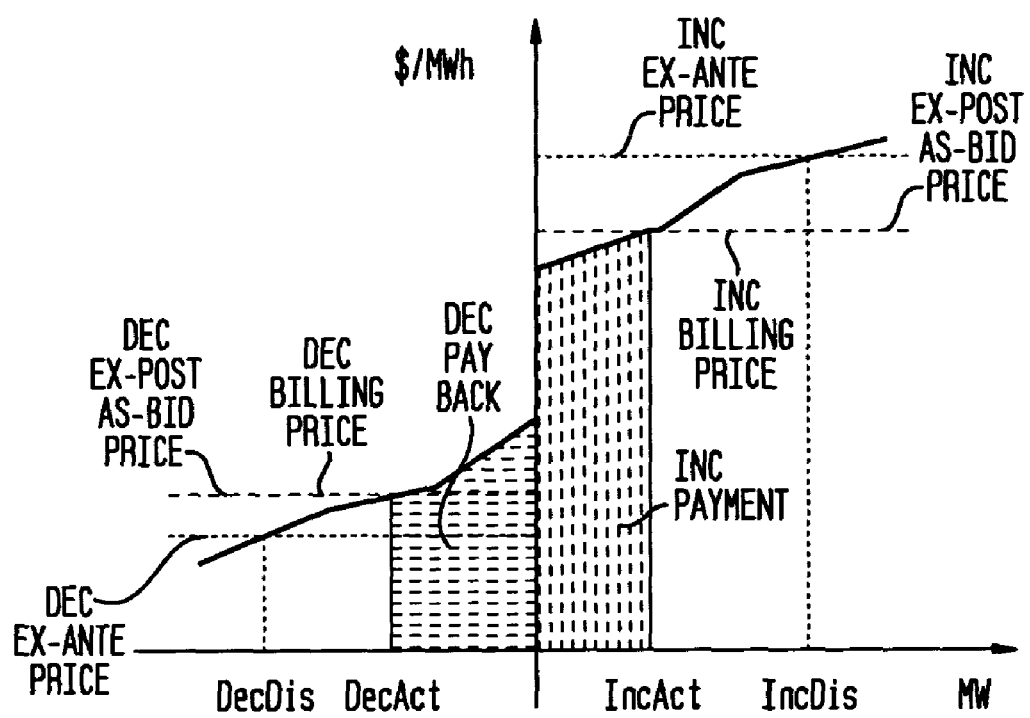
FIG. 16 is a graph of price versus MW.

If actually provided Inc or Dec balancing energy service is lower than the optimal dispatch set point then actual operating costs are covered only. This is illustrated in FIG. 16. The billing price is calculated by the following method:
  Calculate costs as area under the bid curve to the actual point; Calculate billing price as ratio of total costs and actual balancing energy.

These rules set the billing price to be limited by ex-ante as-bid Prices. That is, any market participant cannot directly control the balancing energy price in any case. Uninstructed reduction in balancing energy service below dispatched set point will cause decreasing of the billing price, while uninstructed balancing energy service increasing above dispatched set point will not be awarded by increasing of the billing price. For load market participants, similar pricing rules will be used.

Additionally, for the market non-participants the following rules can be applied:

If movement is in the same direction as the imbalance market requirement, then the provided support will be compensated by setting the billing price equal to some percentage of the locational marginal price. For Inc balancing energy, a percentage less then one hundred will be used (the default value is 90%), and for Dec balancing energy, a percentage higher then one hundred will be used for calculating payment to the RTO (the default value is 110%). To be fully compensated (at 100%) it is necessary for the generator to participate in the market and to contribute in market clearing process and price setting.

If movement is in the opposite direction to imbalance market requirement, then the imbalance disturbance will be charged at the locational marginal price for both Inc and Dec energy imbalances. This rule will be applied in charging for balancing energy to all entities causing system imbalance.

In either case, to provide settlement prices, the five minute billing prices for each market participant are averaged during one hour using the following formula:

$$BP_{mp}^T = \frac{\sum_{t \in T}(IncMW_t \cdot BP_{mp}^t - DecMW_t \cdot BP_{mp}^t)}{\sum_{t \in T}(|IncMW_t| + |DecMW_t|)} \quad (7)$$

Where:
$BP_{mp}^T$ is the settlement billing price for the market participant mp for the period T (one hour);
$IncMW_t$ and $DecMW_t$ is provided Inc and Dec balancing energy for the time interval t (5 minutes);
$BP_{mp}^t$ is the billing price for the market participant mp for the time interval t (5 minutes).

If there is no network congestion, then all market participants belonging to the same pricing zone will have the same price. Additionally, hourly average costs for imbalance requirements for each control area will be calculated as follows:

$$BalCost_{CA}^T = \sum_{t \in T} \frac{ImbReq_{5\ min}^{CA}}{T} \cdot MCP_{5\ min}$$

Where:
$BalCost_{CA}^T$ is the balancing energy cost for the control area for the period T (one hour);
$ImbReq_{5\ min}^{CA}$ is the imbalance requirement of the control area for the time interval t (5 minutes); and
$MCP_{5\ min}$ is the market clearing price for the RTO for the time interval t (5 minutes).

The averaged billing prices and balancing energy total quantities for each market participant are passed to the settlement system for billing purposes.

In a further embodiment of the present invention, it will be understood that instead of the previously described pricing schemes, i.e. pay-as-MCP and pay-as-bid, the two settlement pricing scheme for balancing energy can also be employed. In this approach, imbalance market stability and efficiency is guaranteed with minimal opportunities for gaming by the market participants. This is an essential requirement, especially for real-time markets.

The two settlement pricing scheme combines both ex-ante and ex-post pricing approaches into a consistent two part billing system capable of determining optimal prices for both instructed and uninstructed deviations including network congestion pricing. In the first step, the ex-ante optimal market clearing price and the dispatched set points are provided. These instructed balancing energy quantities are priced by ex-ante locational marginal prices as the contracted obligation for each market participant.

After-the-fact prices for actual provisions are determined using the balancing energy measurements. These ex-post prices are based on an optimal evaluation of the actual conditions and quantities using after-the-fact optimal dispatch solutions. This dispatch presents the imbalance market sensitivity analysis around the actual points including the flow gate power flow operating limits. The ex-post optimal market clearing price is applied to uninstructed deviations.

The two settlement pricing approach consists of the following steps:

Perform market clearing using the as-bid pricing approach;
Implement the ex-ante dispatch instructions;
Collect actual data for balancing energy provided during 5-minute interval for each market participant;
Select a set of market participants qualified for setting of ex-post prices in accordance to market performance criteria;
Calculate actual total RTO balancing energy and set it as the RTO imbalance requirement;
Set market participant bid ranges using narrow limits around after-the-fact provisions of balancing energy;
Set flow gate power flow limits to cover actual power flow;
Execute after-the-fact imbalance market dispatch using submitted balancing energy bids;
Apply the two settlement pricing scheme:
Up to ex-ante dispatch set points apply ex-ante locational marginal prices as billing prices
For after-the-fact deviations around ex-ante dispatch set points, apply ex-post locational marginal prices as billing prices.

The optimal market dispatch 108 determines ex-post prices for actually provided balancing energy. These prices can be used to determine the pay-as-LMP or pay-as-bid purposes in the same way.

After-the-fact imbalance market clearing will provide ex-post prices for actual balancing energy service. Both forward dispatch and actually performed operation will be evaluated from overall market economic efficiency point of view.

The control area in accordance with NERC procedures will calculate inadvertent energy for each control area. In addition, the monetary value of this account will be tracked at the time of the purchases as if it were a wholesale participant in the imbalance market. This eliminates any incentive for load serving entities to game the system by leaning on the inadvertent energy capabilities of the control areas during high price periods and returning the energy at lower price periods.

Inadvertent energy is calculated with respect to scheduled interchanges. All Control Areas will use 5 minute cross-ramping: starting ramping 5 minutes before, and stopping ramping 5 minutes after the top of the hour.

It will be understood that conventional relational database technology can be used as the storage mechanism for the RTO imbalance engine input and output. The requirement for the relational database can be summarized as follows. The relational database should feature:

Ability to store disparate types of data, which are inter-related and possibly dependent. The data model (schema) can be easily modified, with the ability to add or delete structure and data as necessary. The application design interface supports standard languages, tools and interfaces.
Scalability in terms of number of users and amount/type of data stored. The access time is consistent across different database sizes. Maximum database size is limited only by the underlying storage medium.
Integrated data storage management.
Tunable database performance within the platform/operating system.
Upwardly compatibility Platform/operating
Backup and recovery capabilities integrated into database management system ("DBMS") core.
Support for multiple users with different levels of access. For example, allow individual participants to view only their data, but RTO operators can view all data. The user management system is integrated with DBMS, allowing programmatic user support.

Figure 17:
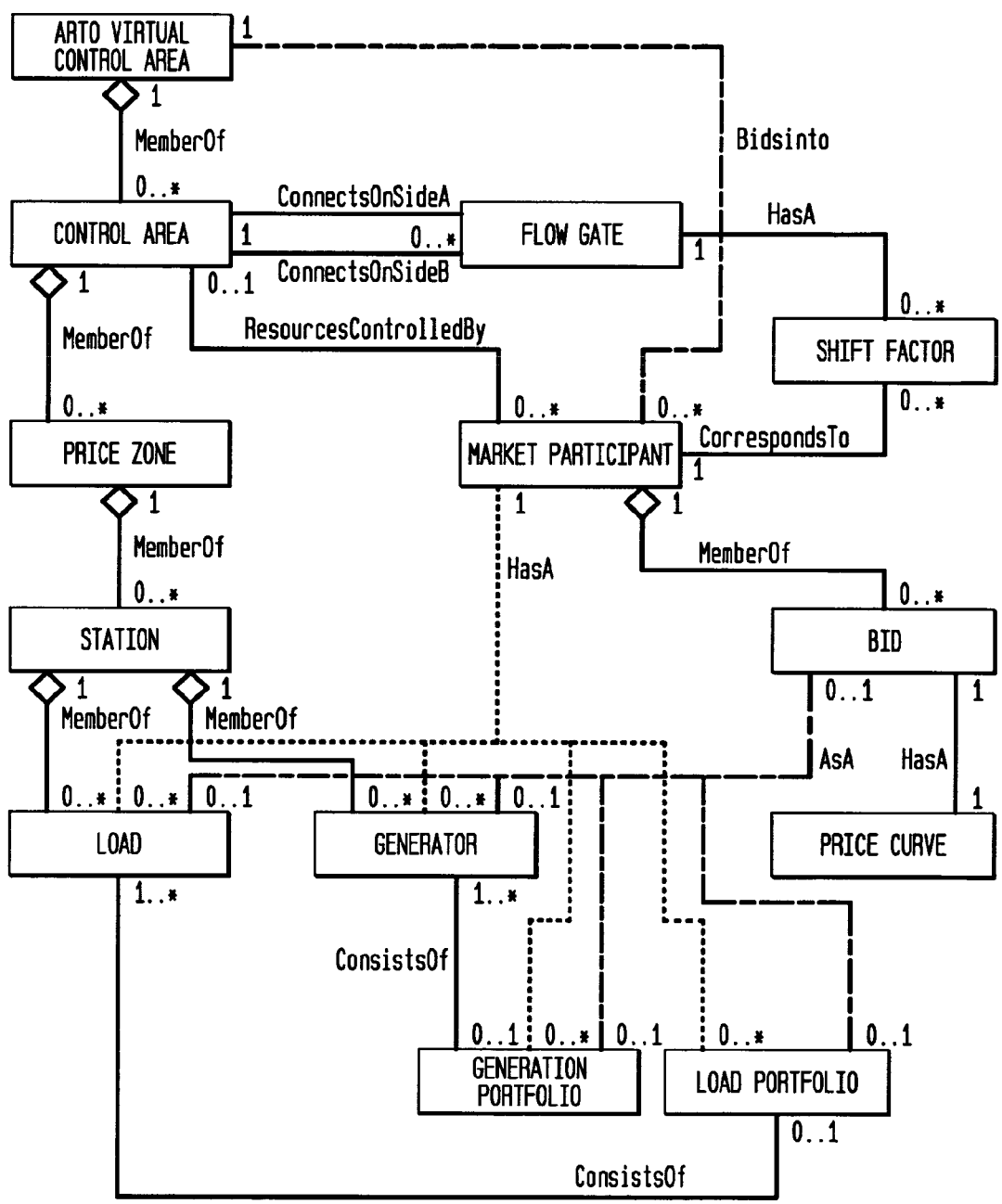
FIG. 17 is an object oriented view of the data model to be used by the imbalance engine of the present invention.

Referring to FIG. 17, there is shown an object oriented view of the data model to be used by the imbalance engine 100 of the present invention. This object-oriented view of the data model is in the Information Model Management system. Most objects will have static attributes defined. The Information Model Management system provides the means of easily updating and/or extending the data model.

In the exemplary embodiment described herein, the real-time imbalance engine database is an Oracle RDBMS. The RDBMS tables typically have a one-to-one correspondence to the objects shown in the figure, but there will be a few exceptions. The static data, defined in the Information Model Management system objects is transferred to the Imbalance Engine RDBMS tables during the population step. In addition to the static data, the Imbalance Engine RDBMS tables will have columns for any dynamic data that needs to be kept persistent and/or displayed.

Referring again to FIG. 2, the imbalance engine 100 of the present invention interfaces to various subsystems. In an exemplary embodiment, the imbalance engine interfaces to the following subsystems:
   Tagging/Scheduling
   NERC Interchange Distribution Calculator (IDC)
   Loss Calculator
   Load Forecast
   Individual Control Area EMS systems via ICCP
   Market Participant entered information via MUI
   Weather center/data
   Security Coordinators
   Outage Scheduler
   Settlement & Billing It will be understood that the above list of subsystems is not exhaustive of the interfaces that the imbalance engine interfaces with. It will be additionally understood that any of the above listed subsystems can be integrated with the imbalance engine 100 of the present invention without deviating from the spirit and scope of the present invention.

Figure 18:
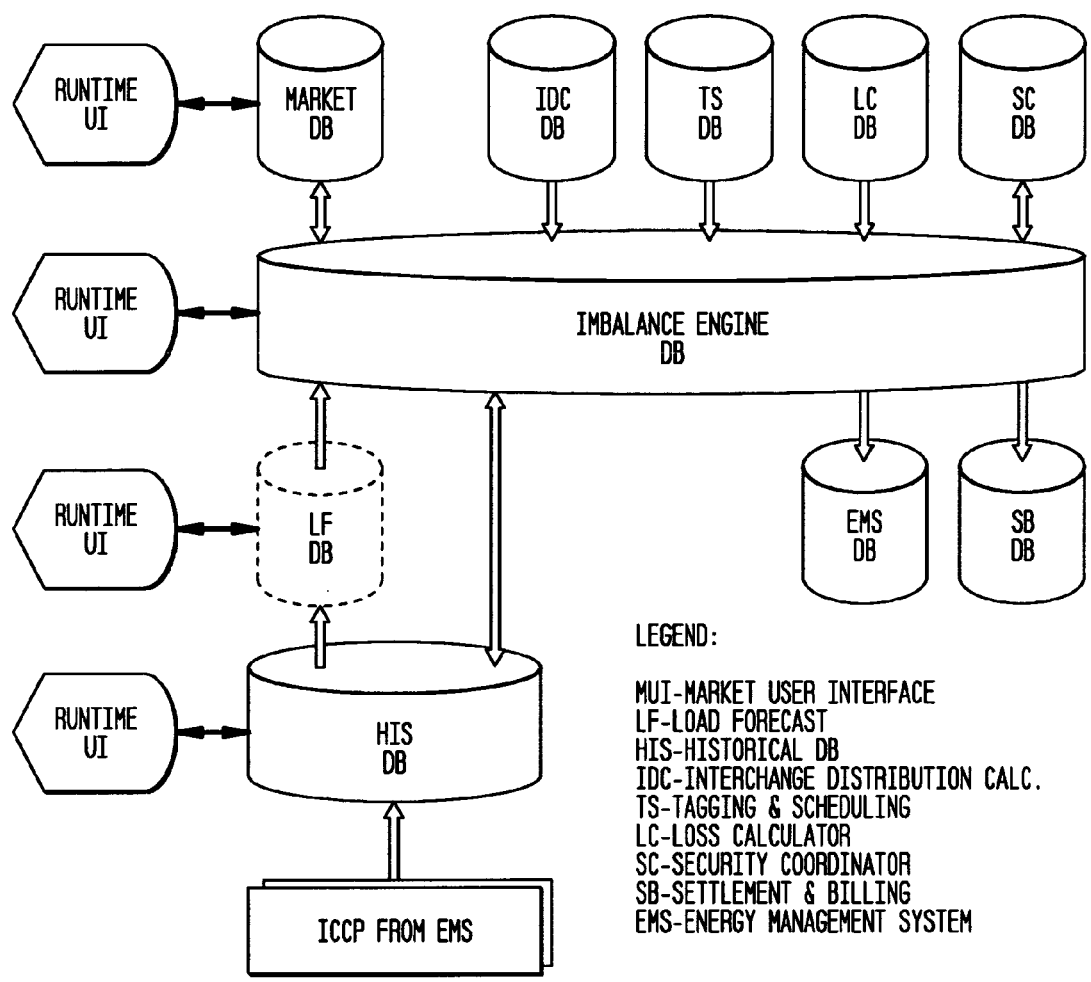
FIG. 18 is shown a schematic diagram of the relationship between the imbalance engine database and the interface databases.

These interfaces are described in further detail below. Referring to FIG. 18, there is shown a schematic diagram of the relationship between the imbalance engine database and the interface databases.

In a preferred embodiment, the imbalance engine database is an Oracle database available commercially from Oracle Corporation of Redwood Shores, Calif. All data transfers are transmitted by means of the interfaces between two Oracle databases, except the bi-directional ICCP connection to the control area EMS systems. The intensity and frequency of data transfers are diverse, but the following common approach will be provided for all data transfers between the imbalance engine database and the interface databases:
   Data interfaces are asynchronous with respect to each other
   Data transfers can be performed from different sources at the same time
   Data transfer is activated whenever source data is changed
   Data is transferred into separate input tables in IE DB
   Data time interval validity is part of transferred data
   Last transfer IE DB time is posted
   Input data can be reviewed and edited by Imbalance Market Operator
   Manually entered or modified data will be treated as new data transfers and the time of last transfer will be updated
   A data snapshot is performed automatically at Imbalance Engine run-time whenever the last transfer time is higher then last snapshot time. The last snapshot time is updated automatically to the time of the IE DB
   Working tables are used for Imbalance Market dispatch only The Market Operator may do the following:
   Activate/block data transfer,
   Enter and modify data in input tables. Each data interface is supported by its own displays presenting Input Tables only,
   Change data validity time,
   Activate/block data snapshot.

Figure 19:
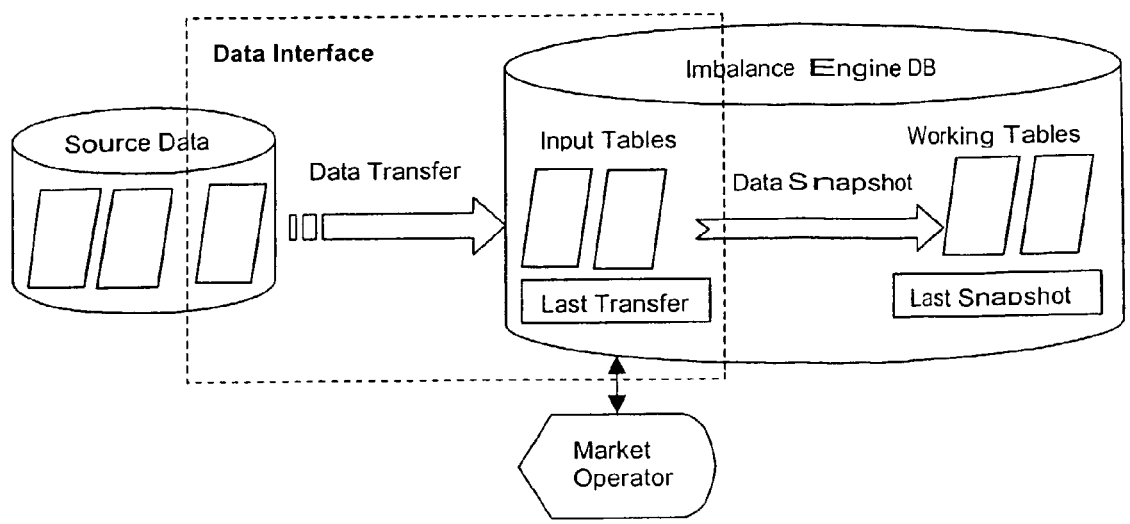
FIG. 19 is a common structure of data interfaces.

Referring to FIG. 19, there is shown a common structure of data interfaces, while specific details are described hereinbelow.

The market database interface is provided to transfer bid data into the imbalance engine database whenever the imbalance market is closed, and to transfer imbalance engine dispatch results into the market database whenever the imbalance engine is executed. The data transfers are performed automatically in accordance to the time-lines of the bidding and clearing processes. Additionally, data transfers can be activated and blocked by the imbalance market operator.

The following data are transferred from the market user interface database into the imbalance engine database whenever the imbalance market is closed:
   Market Participant ID
   Portfolio ID, its resources and percentages of their contribution
   Bid curves
   Scheduled values
   Bid minimal and maximal energy limits
   Bid Up and Down ramp rates
   Bid validity time Such data can be reviewed and edited manually by the imbalance market operator.

In the opposite direction, imbalance market dispatch results for the following three 5-minute intervals are transferred into the market database from the imbalance engine:
   Time stamps
   Load Forecast 5-minute values for RTO and each Control Area
   Imbalance Requirement values for RTO and each Control Area
   Imbalance Requirement type (Inc or Dec) for RTO and each Control Area
   Market Clearing Prices
   Optimal set points for each Market Participant or portfolio
   Actual after-the-fact balancing energy for each Market Participant
   Balancing service type (Inc or Dec) for each Market Participant
   Balancing energy prices for each Market Participant These data are posted on the Market UI for Market Participant usage.

The Imbalance Market Engine retrieves from the Tagging/Scheduling sub-system the next hour schedules for all generators and loads. This interface is designed as an Oracle-to-Oracle database data transfer.

The summary schedules for loads and generators inside one Control Area are provided for each hour. The scheduled data is used for imbalance requirement calculation as well as the reference points for imbalance service calculations. The interface is designed as a stand alone API. It is activated whenever bilateral scheduling checkout is completed (20 minutes before operational hour). The interface activation is performed by the Tagging/Scheduling sub-system. The Imbalance Market Operator is capable of activating this interface manually. On the request of the imbalance market operator, data for some specified market participant and/or some specified hour, including future hours, can be transferred from Tagging and Scheduling.

As default, the following data is transmitted periodically every hour for each market participant:
- market participant ID including its control area/pricing zone specification
- The total scheduled MW value including all bilateral and dynamic schedules for the next hour. In a further embodiment, transmission network losses may be included into calculated scheduled values. The cumulative values of MW are calculated for each market participant and only these cumulative scheduled values are transmitted.

The imbalance engine 100 additionally supports entering of hourly schedules for each market participant. These schedules are used whenever the tagging/scheduling sub-system is not available. These manual schedules are activated and can be edited manually by the imbalance market operator.

The IDC interface provides DC model data for TLRs and inter control area/price zone flow gates. The data transfer will be performed via a web interface. The following data is needed for each flow gate:
- Flowgate ID including source and sink control areas
- Shift factors for each market participant.

The IDC Interface is activated by the IDC whenever flowgate model data are changed, or alternatively on imbalance market operator request.

The loss calculator provides the imbalance engine with loss sensitivity factors for all market participants (control area/price zone or individual generation/load). In a preferred embodiment, this interface is designed as an Oracle-to-Oracle database data transfer.

The loss calculator interface is activated by the loss calculator whenever loss sensitivity factors are re-calculated, or on imbalance market operator request.

The load forecast interface will provide 5-minute loads for the next three 5-minute intervals for each control area. The load forecast results are directly accessible by the imbalance engine and data is transferred automatically in accordance to the imbalance market time-line. No manual operator intervention is needed to transfer this data. This interface is designed as an Oracle-to-Oracle database data transfer.

The HIS/EA function 106 supports the imbalance engine 100 with real time data and stores imbalance market results for market performance monitoring purposes. Data transfers in both directions are cyclical with 5-minute periodicity. The data transfers are activated automatically by source function whenever a new set of data is available.

Additionally, the imbalance market operator can activate/block manually both data transfer directions.

The HIS/EA function 106 will calculate 5-minute average values and transfer them into the imbalance engine database:
- Control area ACE (5-minute ACE average)
- Control area frequency bias component of ACE (5-minute average)
- Control area net interchange (5-minute average)
- Control area generation by unit (5-minute average)
- Status of generation units on imbalance market control to determine whether a unit will participate or not.
- Meter values of load participating directly in the imbalance market (5-minute average)
- Control area load (total control area load, 5-minute average, includes distribution losses)
- Status of participating EMS
- Control area imbalance bias (a bias applied to the imbalance demand to manage regulation unit set points, the bias applies to the next iteration of imbalance market)
- Control area callable reserve
- Inter and intra control area flowgate power flows In the opposite direction, the imbalance engine 100 passes into the HIS/EA database 106 the complete dispatch results for operational 5-minute interval:
- Time stamps
- Load forecast 5-minute values for each control area and RTO
- Scheduled 5-minute values for each control area and RTO
- Imbalance bias values for each control area and RTO
- Frequency bias values for each control area and RTO
- Imbalance requirement values for each control area and RTO
- Imbalance requirement type (Inc or Dec) for each control area and RTO
- Market clearing prices
- Optimal set points and limits for each market participant or portfolio
- Scheduled values for each market participant or portfolio
- Provided balancing energy for each market participant and market non-participant
- Balancing service type (Inc or Dec) for each market participant and market non-participant
- Balancing energy LMP for each market participant and market non-participant
- Balancing energy billing price for each market participant and market non-participant
- Flow gate power flows and limits
- Flow gate shadow prices for congested flow gates.

Additionally, hourly billing prices, quantities and charges for each market participant portfolio are passed to the HIS database for settlement and billing purposes. These interfaces are designed as Oracle-to-Oracle database data transfer in both directions.

The control area EMS systems exchange data with the imbalance market engine through ICCP, via EIB or other batch transfer processes. The following input and output data will be transferred through the ICCP links:

Input Data (through the ICCP):
- Control area 1-minute average ACE for the last minute. This is a NERC CPS1 reported ACE.
- Control area frequency bias component of ACE (1-minute average). This is the frequency error times the frequency bias divided by 10. Frequency error is calculated off the scheduled frequency, so time error correction is already taken care of this way.
- Control area generation by unit (1-minute average). This is an integrated value every minute for all generators.
- Status of generation units on imbalance market control to determine whether a unit will participate or not.
- Meter values of load participating directly in the imbalance market (, 1-minute average)
- Control area load (total Control Area load, 1-minute average)

Status of participating EMS. If the ICCP node is up, the imbalance engine needs EMS On/Off. If the ICCP node is down, then the quality flag of the ICCP will say failed Control area imbalance bias for the next 5-minute interval (a bias applied to the imbalance demand to manage regulation unit set points, the bias applies to the next iteration of the imbalance market). This can be used to take care of self-supplying control areas.

Control area callable reserve that is being sent to or supplied from another control area All tie-line power flows Flow gate power flows Hourly net output of generation from integrated meter readings (these hourly accumulated values are compared with hourly integrated 5-minute values for reporting purposes only)

Hourly meter data for load participating directly in the imbalance market (these hourly accumulated values are compared with hourly integrated 5-minute values for reporting purposes only)

Output Data (through ICCP and EIB) for the next three 5-minute intervals:

Dynamic schedules for net interchange for each control area

Forecasted control area load for next two 5-minute intervals

Dynamic schedules for imbalance requirement for each control area

Set points for imbalance providers by portfolio and by unit

A set point for the operational 5-minute interval for imbalance providers by unit Locational marginal prices of imbalance energy for imbalance providers by portfolio The average hourly RTO-wide market clearing price for calculating network customers bills at the TOs.

The following input data will be transferred via EIB or other batch transfer processes:

Input Data (through EIB):

Generator restrictions due to must run requirements, or congestion imposed via provision of regulation or other obligations to the Control Area (max limits, min limits).

Adjusted quantities for LSE customers (corrected data, generally a delta adjustment by hour).

Adjustments to generator and tie-line meter data (corrected data for settlements with generation, generally an adjustment for each 5-minute interval).

It will be noted that the imbalance market operator can activate/block manually data transfers in both directions.

The security coordinator can set inter control area flow gate power flow limits. Additionally, balancing energy dynamic schedules can be reported for security analysis. In both directions, data transfer is performed via EIB subsystem.

The following data is transferred to the settlement/billing system:

Quantity, price and charge for each 5-minute interval for all generators (market participants and market non-participants)

Quantity, price and charge for each 5-minute interval for all loads that are participating in the imbalance market Billing quantity, price and charge for each hour for all generators (market participants and market non-participants)

Billing quantity, price and charge for each hour for all loads that are participating in the imbalance market The quantities and prices of balancing energy are passed to the settlement system via EIB for billing purposes only.

The above described embodiments are merely exemplary. Those of ordinary skill in the art may readily devise their own implementations that incorporate the principles of the present invention and fall within the spirit and scope thereof.

What is claimed is:

1. A computer readable medium having computer readable instructions embedded therein, which, when executed by a computer, cause the computer to implement a method for adjusting energy generation and energy load in an energy imbalance market to remedy energy generation and energy load imbalances therein, comprising:

providing a plurality of imbalance market user interfaces, each imbalance market user interface configured for receiving from a plurality of imbalance market participants,—including generating participants and load participants in an energy distribution region subdivided into a plurality of different control areas, energy supply and energy demand requirements for imbalance energy in an energy imbalance market;

retrieving said energy supply and energy demand requirements for imbalance energy from said plurality of imbalance market user interfaces;

determining respective control area imbalance requirements for balancing generation and load imbalances in each of the control areas in the energy distribution region according to the following relationship:

$$ImbReq = LF - \sum_{stp} \sum_{mp} SchedE - ACE + ImbBias - ImbCA;$$

wherein ImbReq is the respective control area imbalance requirement, LF is a load forecast for the respective control area, SchedE is a scheduled energy distribution according to a bilateral energy trading market; mp is unique identifier for each market participant, stp is an identifier for a type of market participant, ACE is a prior average area control error for the respective control area, ImbBias is a temporal imbalance bias for the respective control area, and ImbCA is a temporal imbalance callable reserve for the respective control area;

determining a region imbalance requirement for balancing generation and load imbalances in the energy distribution region responsive to the respective control area imbalance requirements;

determining optimal dispatch of energy generation and energy load for each imbalance market participant responsive to the energy distribution region imbalance requirement; and issuing dispatch instructions responsive to the optimal dispatch of energy generation and energy load to each imbalance market participant.

2. The computer readable medium of claim 1, wherein said optimal dispatch is calculated in real-time.

3. The computer readable medium of claim 2, wherein said optimal dispatch is calculated in real-time for the plurality of control areas.

4. The computer readable medium of claim 1, wherein said optimal dispatch is calculated in five minute intervals.

5. The computer readable medium of claim 1, wherein retrieving said energy supply and energy demand requirements further comprises receiving pricing information from said market participants.

6. The computer readable medium of claim 5, wherein said pricing information is in a step-wise price curve form.

7. The computer readable medium of claim 5, wherein said pricing information is in a piecewise linear price curve form.

8. The computer readable medium of claim 1, wherein retrieving said energy supply and energy demand requirements further comprises pricing information from said market participants for fixed time intervals.

9. The computer readable medium of claim 8, wherein said fixed time interval is fifteen minutes.

10. The computer readable medium of claim 1, wherein the method further comprises:
retrieving market information from a market database;
retrieving historical information from an HIS database; and
pricing said optimal dispatch of energy generation and energy load for each participant responsive to the market information and the historical information.

11. The computer readable medium of claim 10, wherein said market database tracks bidding data including imbalance energy bids from market participants.

12. The computer readable medium of claim 11, wherein the method further comprises processing the bidding data from said imbalance market participants.

13. The computer readable medium of claim 10, wherein—the method further comprises:
retrieving clearance data from said imbalance market participants; and
processing the clearance data from said imbalance market participants to determine optimal dispatch of energy generation and energy load for each imbalance market participant.

14. The computer readable medium of claim 11, wherein the method further comprises clearing imbalance energy bids across the plurality of control areas.

15. The computer readable medium of claim 10, wherein the method further comprises generating optimal pricing parameters for dispatched instructions.

16. A method for adjusting energy generation and energy load in an energy imbalance market to remedy energy generation and energy load imbalances therein, said method comprising:
receiving from a plurality of imbalance market participants, including generating participants and load participants in an energy distribution region subdivided into a plurality of different control areas, energy supply and energy demand requirements for imbalance energy in an energy imbalance market;
determining respective control area imbalance requirements for balancing generation and load imbalances in each of the control areas in the energy distribution region according to the following relationship:

$$ImbReq = LF - \sum_{stp} \sum_{mp} SchedE - ACE + ImbBias - ImbCA;$$

wherein ImbReq is the respective control area imbalance requirement, LF is a load forecast for the respective control area, SchedE is a scheduled energy distribution according to a bilateral energy trading market; mp is unique identifier for each market participant, stp is an identifier for a type of market participant, ACE is a prior average area control error for the respective control area, ImbBias is a temporal imbalance bias for the respective control area, and ImbCA is a temporal imbalance callable reserve for the respective control area;
determining a region imbalance requirement for balancing generation and load imbalances in the energy distribution region responsive to the respective control area imbalance requirements;
determining optimal dispatch of energy generation and energy load for each imbalance market participant;
responsive to the energy distribution region imbalance requirement;
issuing dispatch instructions responsive to the optimal dispatch of energy generation and energy load to each imbalance market participant; and
using the imbalance dispatch instructions for controlling the participants' respective energy generation and energy load to remedy energy generation and energy load imbalances in the imbalance market.

17. A method for adjusting energy generation and energy load in an energy imbalance market of an energy distribution system separate from a bilateral energy trading market and an automatic generation control function of the energy distribution system, the energy distribution system including an energy distribution region subdivided into a plurality of different control areas including imbalance market participants, the method comprising:
receiving from a plurality of imbalance market participants in an energy distribution region, including energy generation participants and energy load participants, energy supply and energy demand requirements for imbalance energy in an energy imbalance market; and
determining respective control area imbalance requirements for balancing generation and load imbalances in each of the control areas in the region according to the following relationship:

$$ImbReq = LF - \sum_{stp} \sum_{mp} SchedE - ACE + ImbBias - ImbCA;$$

wherein ImbReq is the respective control area imbalance requirement, LF is a load forecast for the respective control area, SchedE is a scheduled energy distribution according to a bilateral energy trading market; mp is unique identifier for each market participant, stp is an identifier for a type of market participant, ACE is a prior average area control error for the respective control area, ImbBias is a temporal imbalance bias for the respective control area, and ImbCA is a temporal imbalance callable reserve for the respective control area;
determining a region imbalance requirement for balancing generation and load imbalances in the energy distribution region responsive to the respective control area imbalance requirements,
determining optimal dispatch of energy generation and energy load for each participant in the energy distribution region responsive to the region imbalance requirement;
issuing imbalance dispatch instructions responsive to the determined optimal dispatch of energy generation and energy load to each imbalance market participant; and
using the imbalance dispatch instructions for controlling the participants' respective energy generation and energy load to remedy energy generation and energy load imbalances in the imbalance market.

* * * * *